United States Patent
Takada et al.

(10) Patent No.: US 12,322,000 B2
(45) Date of Patent: Jun. 3, 2025

(54) PHOTOELECTRIC CONVERSION DEVICE AND IMAGING SYSTEM

(71) Applicant: CANON KABUSHIKI KAISHA, Tokyo (JP)

(72) Inventors: Hideaki Takada, Yokohama (JP); Kazuo Yamazaki, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 336 days.

(21) Appl. No.: 17/692,970

(22) Filed: Mar. 11, 2022

(65) Prior Publication Data

US 2022/0201233 A1 Jun. 23, 2022

Related U.S. Application Data

(62) Division of application No. 16/701,029, filed on Dec. 2, 2019, now Pat. No. 11,310,453.

(30) Foreign Application Priority Data

Dec. 6, 2018 (JP) .................................. 2018-229127

(51) Int. Cl.
*H04N 25/75* (2023.01)
*G06T 7/55* (2017.01)
(Continued)

(52) U.S. Cl.
CPC ............. *G06T 7/55* (2017.01); *H04N 25/445* (2023.01); *H04N 25/65* (2023.01); *H04N 25/78* (2023.01); *G06T 2207/30252* (2013.01)

(58) Field of Classification Search
CPC ...... H04N 25/75; H04N 25/445; H04N 25/60; G06T 7/55; G06T 2207/30252
(Continued)

(56) References Cited

U.S. PATENT DOCUMENTS 7,187,052 B2   3/2007   Okita
7,283,305 B2   10/2007  Okita
(Continued)

FOREIGN PATENT DOCUMENTS

JP   2010-68123 A   3/2010
JP   2013-55589     3/2013
(Continued)

OTHER PUBLICATIONS

Japanese Search Report issued Sep. 29, 2022 in corresponding Japanese Application No. 2018-229127 (English translation included).
(Continued)

*Primary Examiner* — Joseph G Ustaris
*Assistant Examiner* — Jimmy S Lee
(74) *Attorney, Agent, or Firm* — VENABLE LLP

(57) ABSTRACT

A photoelectric conversion device includes a pixel that outputs a pixel signal in accordance with an incident light, a plurality of signal holding units each configured to hold the pixel signal, an AD conversion unit that converts the pixel signal from analog signal to digital signal, a first switch circuit provided between the pixel and the plurality of signal holding units, and a second switch circuit provided between the plurality of signal holding units and the AD conversion unit. The first switch circuit is configured to connect the pixels to the plurality of signal holding units individually to hold one pixel signal in the plurality of signal holding units, respectively, in different sampling periods, the second switch circuit is configured to switch connection between the plurality of signal holding units and the AD conversion unit, and pixel signals held in the plurality of signal holding units are averaged and output.

4 Claims, 12 Drawing Sheets

(51) Int. Cl.
 *H04N 25/445* (2023.01)
 *H04N 25/65* (2023.01)
 *H04N 25/78* (2023.01)
(58) Field of Classification Search
 USPC .......................................................... 348/135
 See application file for complete search history.

(56) References Cited

U.S. PATENT DOCUMENTS

| | | | |
|---|---|---|---|
| 7,423,790 B2 | 9/2008 | Kochi | |
| 7,531,885 B2 | 5/2009 | Okita | |
| 7,538,804 B2 | 5/2009 | Okita | |
| 7,557,847 B2 | 7/2009 | Okita | |
| 7,629,568 B2 | 12/2009 | Koizumi | |
| 7,646,493 B2 | 1/2010 | Okita | |
| 7,816,755 B2 | 10/2010 | Yamazaki | |
| 7,889,254 B2 | 2/2011 | Kochi | |
| 7,906,755 B2 | 3/2011 | Koizumi | |
| 7,948,541 B2 | 5/2011 | Koizumi | |
| 8,049,799 B2 | 11/2011 | Sonoda | |
| 8,053,718 B2 | 11/2011 | Koizumi | |
| 8,106,343 B2 | 1/2012 | Arishima | |
| 8,120,686 B2 | 2/2012 | Hatano | |
| 8,325,260 B2 | 12/2012 | Yamazaki | |
| 8,411,178 B2 | 4/2013 | Ogura | |
| 8,493,487 B2 | 7/2013 | Takada | |
| 8,519,316 B2 | 8/2013 | Kawabata | |
| 8,643,765 B2 | 2/2014 | Takada | |
| 8,760,337 B2 | 6/2014 | Yamazaki | |
| 8,797,435 B2 | 8/2014 | Koizumi | |
| 8,810,706 B2 | 8/2014 | Yamazaki | |
| 8,836,313 B2 | 9/2014 | Takagi | |
| 9,040,895 B2 | 5/2015 | Kawabata | |
| 9,060,139 B2 | 6/2015 | Yamazaki | |
| 9,153,610 B2 | 10/2015 | Kobayashi | |
| 9,288,415 B2 | 3/2016 | Yamazaki | |
| 9,294,692 B2 | 3/2016 | Tashiro | |
| 9,319,610 B2 | 4/2016 | Wakabayashi | |
| 9,407,847 B2 | 8/2016 | Maehashi | |
| 9,438,841 B2 | 9/2016 | Yamazaki | |
| 9,445,026 B2 | 9/2016 | Kobayashi | |
| 9,509,931 B2 | 11/2016 | Kobayashi | |
| 9,667,901 B2 | 5/2017 | Sakai | |
| 9,681,076 B2 | 6/2017 | Ogura | |
| 9,762,840 B2 | 9/2017 | Yamazaki | |
| 10,403,658 B2 | 9/2019 | Takada | |
| 11,115,608 B2 | 9/2021 | Sakai | |
| 2005/0174552 A1 | 8/2005 | Takada | |
| 2009/0147114 A1* | 6/2009 | Feng | H04N 25/00 348/294 |
| 2009/0201406 A1 | 8/2009 | Okita | |
| 2010/0188542 A1* | 7/2010 | Mizuguchi | H04N 25/78 348/E5.091 |
| 2012/0013778 A1 | 1/2012 | Sonoda | |
| 2012/0105670 A1 | 5/2012 | Arashima | |
| 2013/0020469 A1 | 1/2013 | Okura | |
| 2013/0140467 A1 | 6/2013 | Kitano | |
| 2013/0193310 A1 | 8/2013 | Ryoki | |
| 2014/0014817 A1* | 1/2014 | Motonaga | H04N 25/75 250/208.1 |
| 2014/0027611 A1 | 1/2014 | Patel | |
| 2014/0117211 A1 | 5/2014 | Arashima | |
| 2014/0160334 A1 | 6/2014 | Wakabayashi | |
| 2014/0285692 A1 | 9/2014 | Sasaki | |
| 2015/0077605 A1 | 3/2015 | Takada | |
| 2015/0229832 A1 | 8/2015 | Itano | |
| 2017/0034422 A1* | 2/2017 | Ono | H01L 27/14641 |
| 2017/0187967 A1* | 6/2017 | Kyushima | H04N 5/32 |
| 2018/0184026 A1* | 6/2018 | Kato | H04N 25/616 |
| 2018/0330481 A1 | 11/2018 | Watanabe | |
| 2018/0359441 A1 | 12/2018 | Luo | |
| 2019/0020838 A1 | 1/2019 | Hatakeyama | |
| 2019/0394416 A1 | 12/2019 | Kobayashi | |
| 2020/0084397 A1 | 3/2020 | Yamazaki | |

FOREIGN PATENT DOCUMENTS

| | | |
|---|---|---|
| JP | 2013-157889 A | 8/2013 |
| JP | 2014-22822 A | 2/2014 |
| JP | 2014-22823 A | 2/2014 |
| JP | 2014-22824 A | 2/2014 |
| JP | 2014-33433 A | 2/2014 |
| JP | 2015-154089 A | 8/2015 |
| JP | 2016-213740 A | 12/2016 |
| JP | 2017-167126 A | 9/2017 |

OTHER PUBLICATIONS

Japanese Search Report issued Mar. 9, 2023 in corresponding Japanese Application No. 2018-229127 (English translation included).

* cited by examiner

PHOTOELECTRIC CONVERSION DEVICE AND IMAGING SYSTEM

BACKGROUND OF THE INVENTION

Field of the Invention

The present invention relates to a photoelectric conversion device and an imaging system.

Description of the Related Art

An imaging system such as a digital still camera, a digital camcorder, or the like often has a capturing mode for a still image and a capturing mode for a moving image. In a solid-state imaging device mounted on such an imaging system, there is a demand for higher resolution for a use of still image capturing than that for a moving image and a high framerate for a use of moving image capturing. Thus, in moving image capturing, a signal having resolution in accordance with a moving image standard such as full HD or 4K is read out from an imaging unit of high resolution that meets still image capturing. A method for reading out a pixel signal having the number of pixels in accordance with predetermined resolution from multiple pixels may be, for example, a method of reducing rows or columns at certain regular intervals and performing readout or a method of averaging or adding pixel signals on neighboring rows or columns and performing readout.

Here, reduction of noise superimposing on a pixel signal is an object common to solid-state imaging devices. Further, when pixel signals for the number of pixels in accordance with predetermined resolution are read out from multiple pixels, reduction of noise superimposing on a pixel signal is important.

Japanese Patent Application Laid-Open No. 2013-055589 discloses an imaging device that has a plurality of output lines and a plurality of analog-to-digital (AD) conversion unit in accordance with the number of output lines for each column of the pixel array and is configured to be able to switch the connection between the plurality of output lines and the plurality of AD converters. Further, Japanese Patent Application Laid-Open No. 2013-055589 discloses that two AD converters are connected to one output line, a single signal is converted by the two AD converters, respectively, and thereby noise is reduced.

In the technology disclosed in Japanese Patent Application Laid-Open No. 2013-055589, however, a plurality of AD conversion units are required to be provided to one output line when a noise reduction process is performed, and an increase in the circuit area or power consumption is unavoidable. Further, in Japanese Patent Application Laid-Open No. 2013-055589, a drive mode to read out pixel signals for the number of pixels in accordance with predetermined resolution from multiple pixels is not considered.

SUMMARY OF THE INVENTION

The present invention intends to provide a photoelectric conversion device and an imaging system that can reduce noise superimposing on a pixel signal when performing readout driving with reduced resolution, while suppressing an increase in the area or an increase in power consumption of a readout circuit unit.

According to one aspect of the present invention, provided is a photoelectric conversion device including a pixel that outputs a pixel signal in accordance with an incident light, a plurality of signal holding units each configured to hold the pixel signal, an AD conversion unit that converts the pixel signal from an analog signal to a digital signal, a first switch circuit provided between the pixel and the plurality of signal holding units, and a second switch circuit provided between the plurality of signal holding units and the AD conversion unit, wherein the first switch circuit is configured to connect the pixel to the plurality of signal holding units individually so as to hold one pixel signal output from the pixel in the plurality of signal holding units, respectively, in different sampling periods, wherein the second switch circuit is configured to switch connection between the plurality of signal holding units and the AD conversion unit, and wherein pixel signals held in the plurality of signal holding units are averaged and output.

Further, according to another aspect of the present invention, provided is a photoelectric conversion device including a plurality of pixels arranged to form a plurality of columns, a plurality of AD conversion units each provided to corresponding one of the plurality of columns, and a readout circuit unit provided between the plurality of pixels and the plurality of AD conversion units, wherein the readout circuit unit includes a first switch, a second switch, and a signal holding unit for each of the plurality of columns, wherein, on each of the columns, the first switch and the second switch are connected in series between a pixel of the plurality of pixels and an AD conversion unit of the plurality of AD conversion units, and wherein on each of the columns, the signal holding units is connected to a first node between the second switch and the AD conversion unit, wherein the readout circuit unit further includes a plurality of third switches and a plurality of fourth switches each provided between neighboring columns, wherein a third switch of the plurality of third switches is connected between second nodes, each of which connects the first switch and the second switch, on neighboring columns, and wherein a fourth switch of the plurality of fourth switches is connected between the first nodes on neighboring columns.

Further, according to yet another aspect of the present invention, provided is a signal processing device including an input unit to which a signal is input, a plurality of signal holding units each configured to hold a signal input from the input unit, an AD conversion unit that converts the signal from an analog signal to a digital signal, a first switch circuit provided between the input unit and the plurality of signal holding units, and a second switch circuit provided between the plurality of signal holding units and the AD conversion unit, wherein the first switch circuit is configured to connect the input unit to the plurality of signal holding units individually so as to hold the input signal in the plurality of signal holding units, respectively, in different sampling periods, wherein the second switch circuit is configured to switch connection between the plurality of signal holding units and the AD conversion unit, and wherein signals held in the plurality of signal holding units are averaged and output.

Further, according to yet another aspect of the present invention, provided is a signal processing device including a plurality of input units to which signals are input, a plurality of AD conversion units each arranged to corresponding one of the plurality of input units to form a plurality of columns, and a readout circuit unit provided between the plurality of input units and the plurality of AD conversion units, wherein the readout circuit unit includes a first switch, a second switch, and a signal holding unit for each of the plurality of columns, wherein, on each of the columns, the first switch and the second switch are connected in series between an input unit of the plurality of input units and an AD conversion unit of the plurality of AD conversion units, and wherein on each of the columns, the signal holding units is connected to a first node between the second switch and the AD conversion unit, wherein the readout circuit unit further includes a plurality of third switches and a plurality of fourth switches each provided between neighboring columns, wherein a third switch of the plurality of third switches is connected between second nodes, each of which connects the first switch and the second switch, on neighboring columns, and wherein a fourth switch of the plurality of fourth switches is connected between the first nodes on neighboring columns.

Further features of the present invention will become apparent from the following description of exemplary embodiments with reference to the attached drawings.

DESCRIPTION OF THE EMBODIMENTS

First Embodiment

Figure 1:
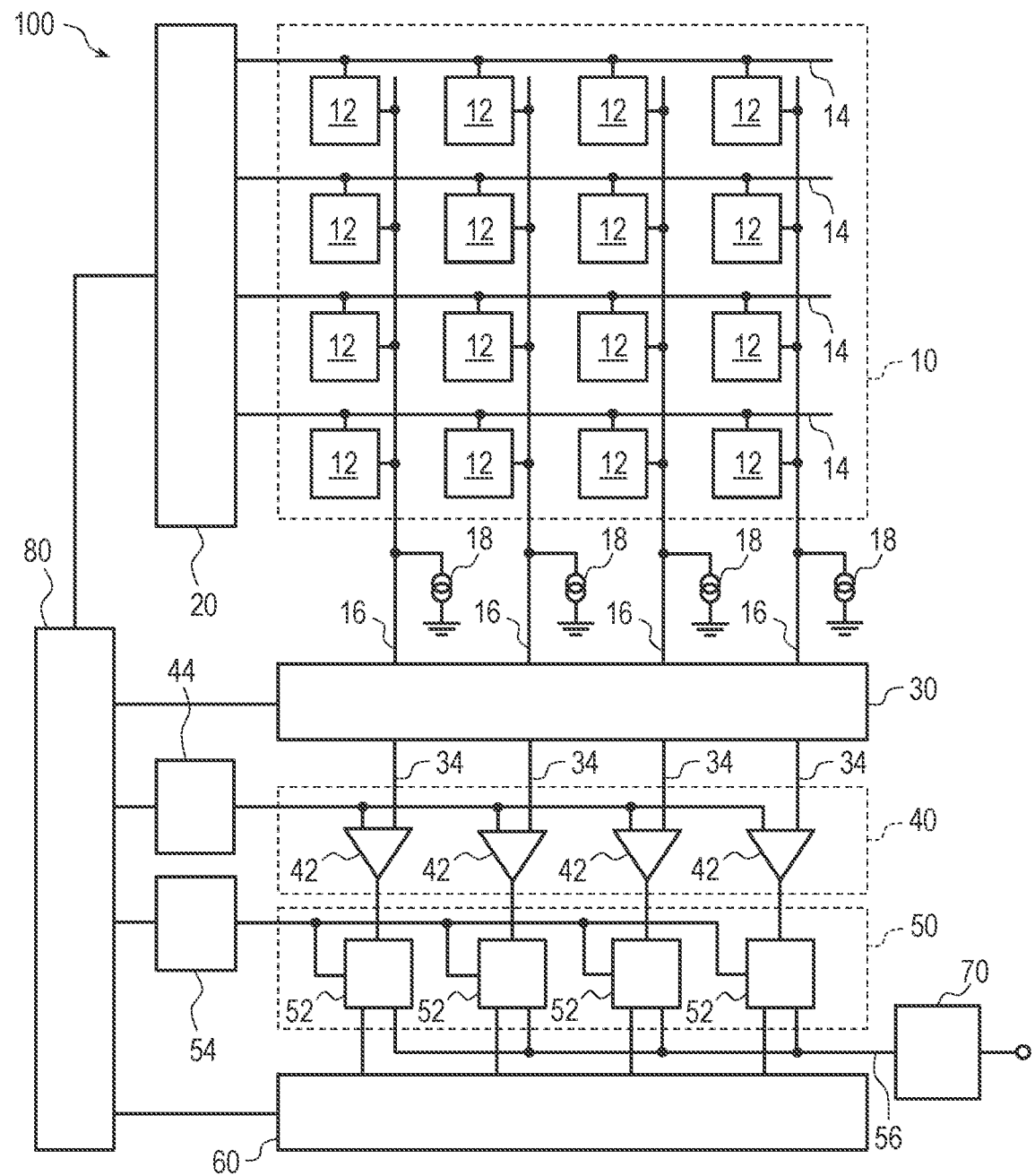
FIG. 1 is a block diagram illustrating a general configuration of a solid-state imaging device according to a first embodiment of the present invention.
Figure 2:
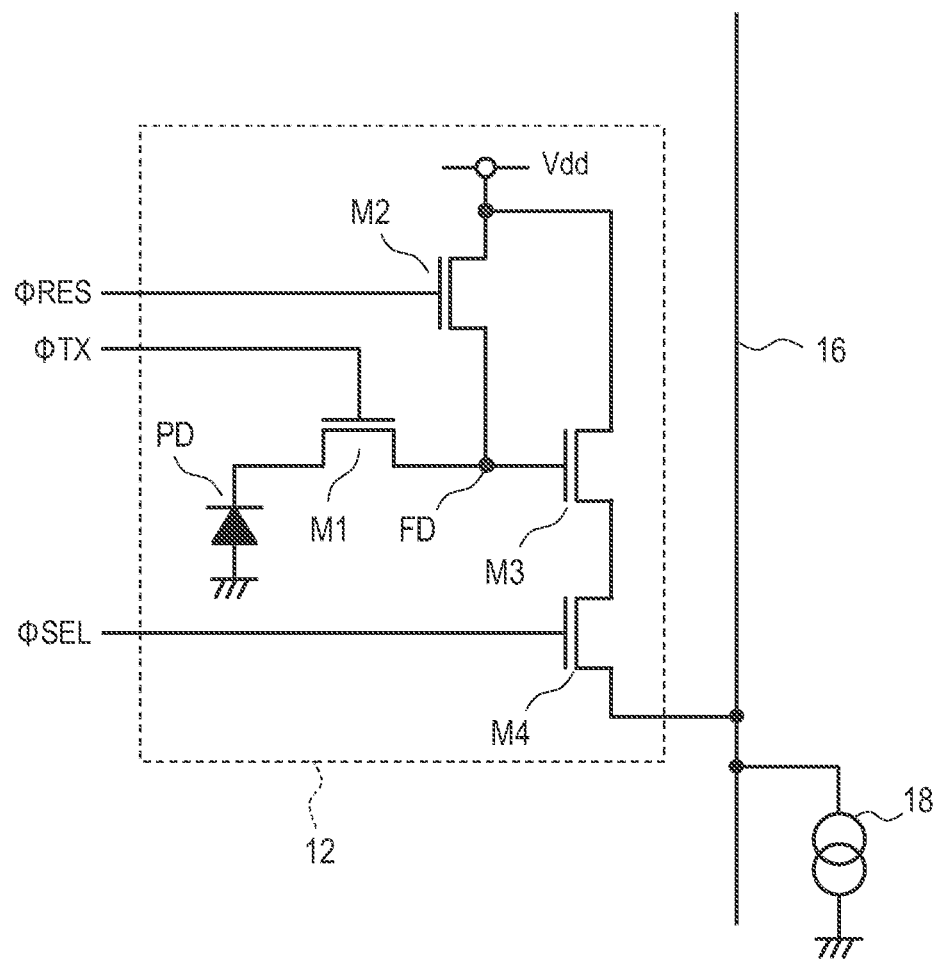
FIG. 2 is a circuit diagram illustrating a configuration example of a pixel in the solid-state imaging device according to the first embodiment of the present invention.
Figure 3:
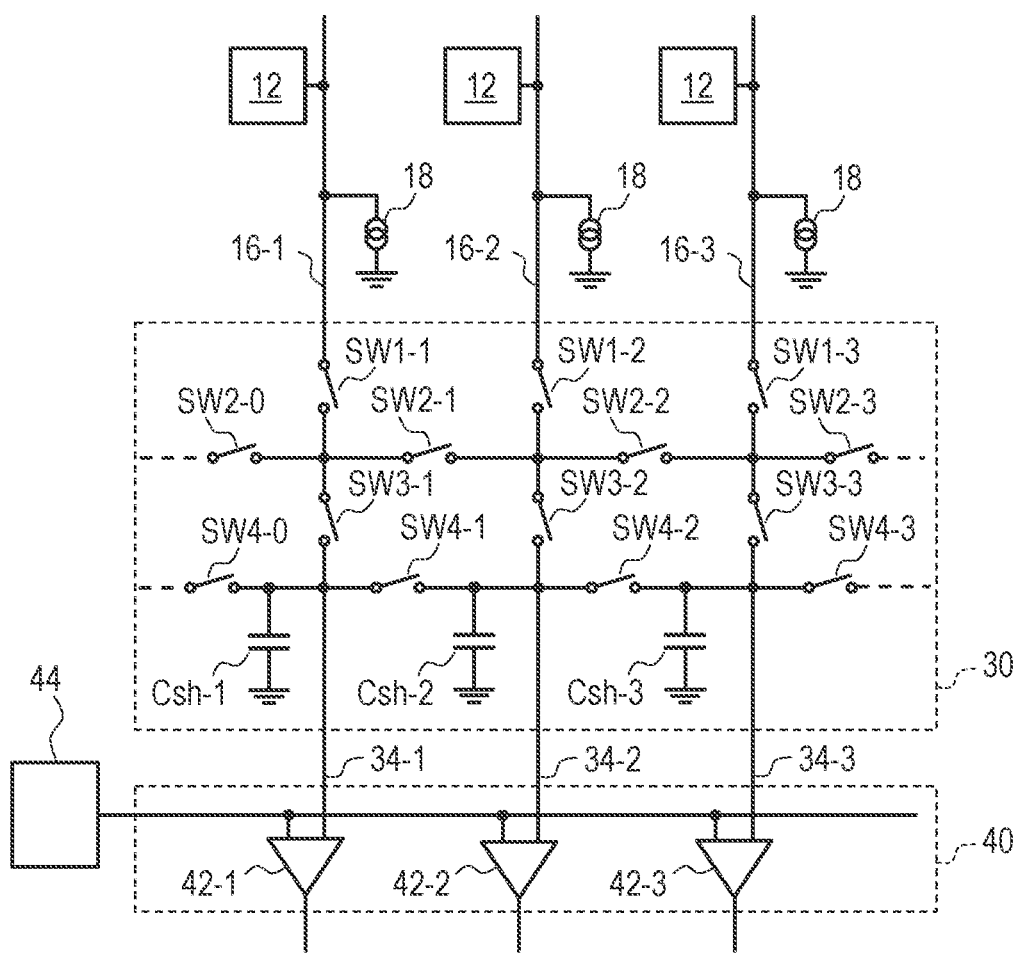
FIG. 3 is a circuit diagram illustrating a configuration example of a readout circuit unit in the solid-state imaging device according to the first embodiment of the present invention.
Figure 4:
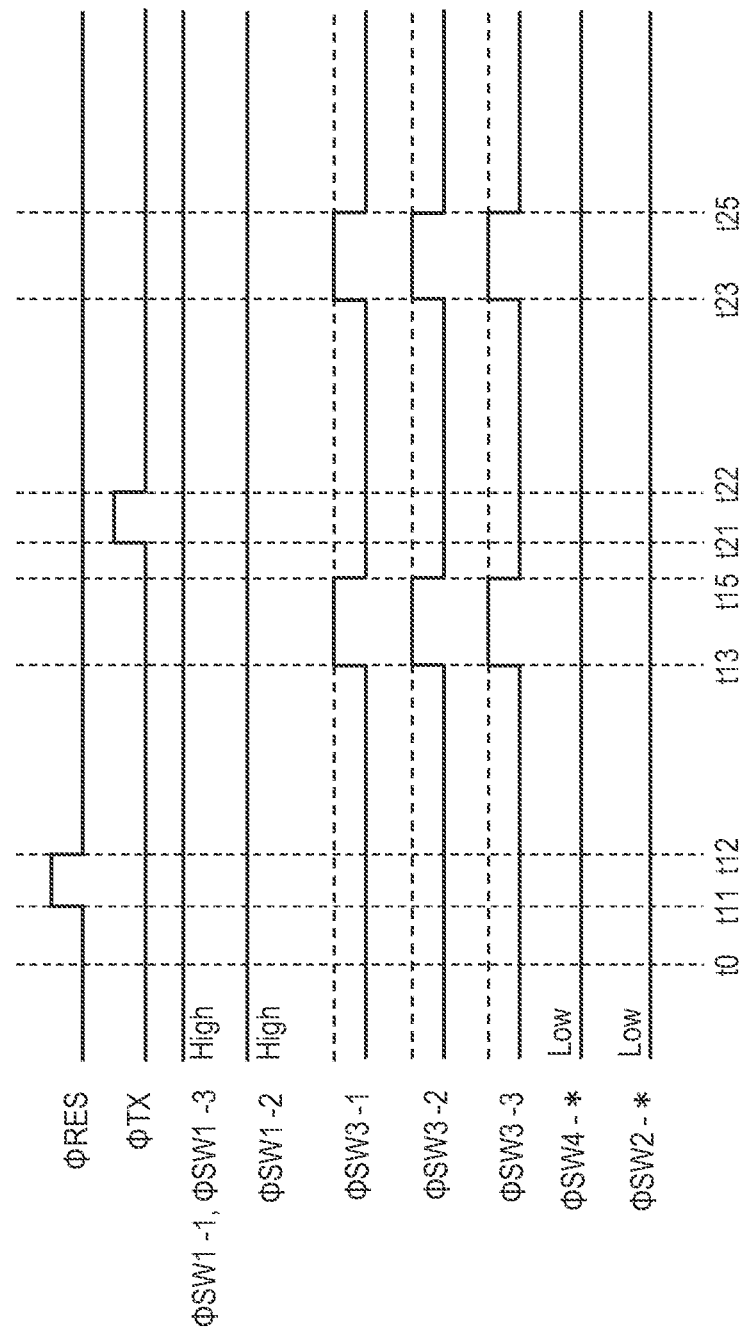
FIG. 4, FIG. 5, and FIG. 6 are timing diagrams illustrating methods of driving the solid-state imaging device according to the first embodiment of the present invention.
Figure 5:
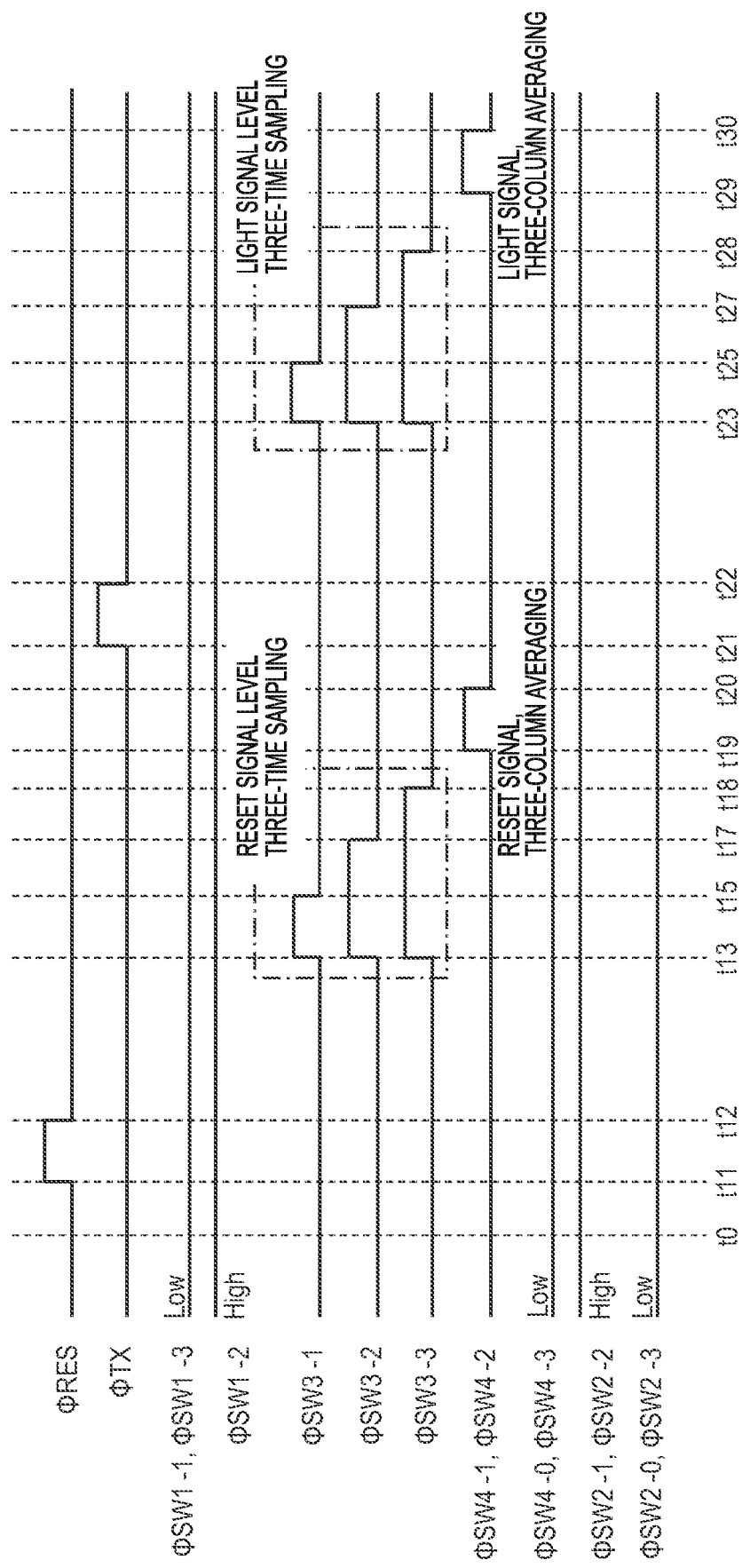
Figure 6:
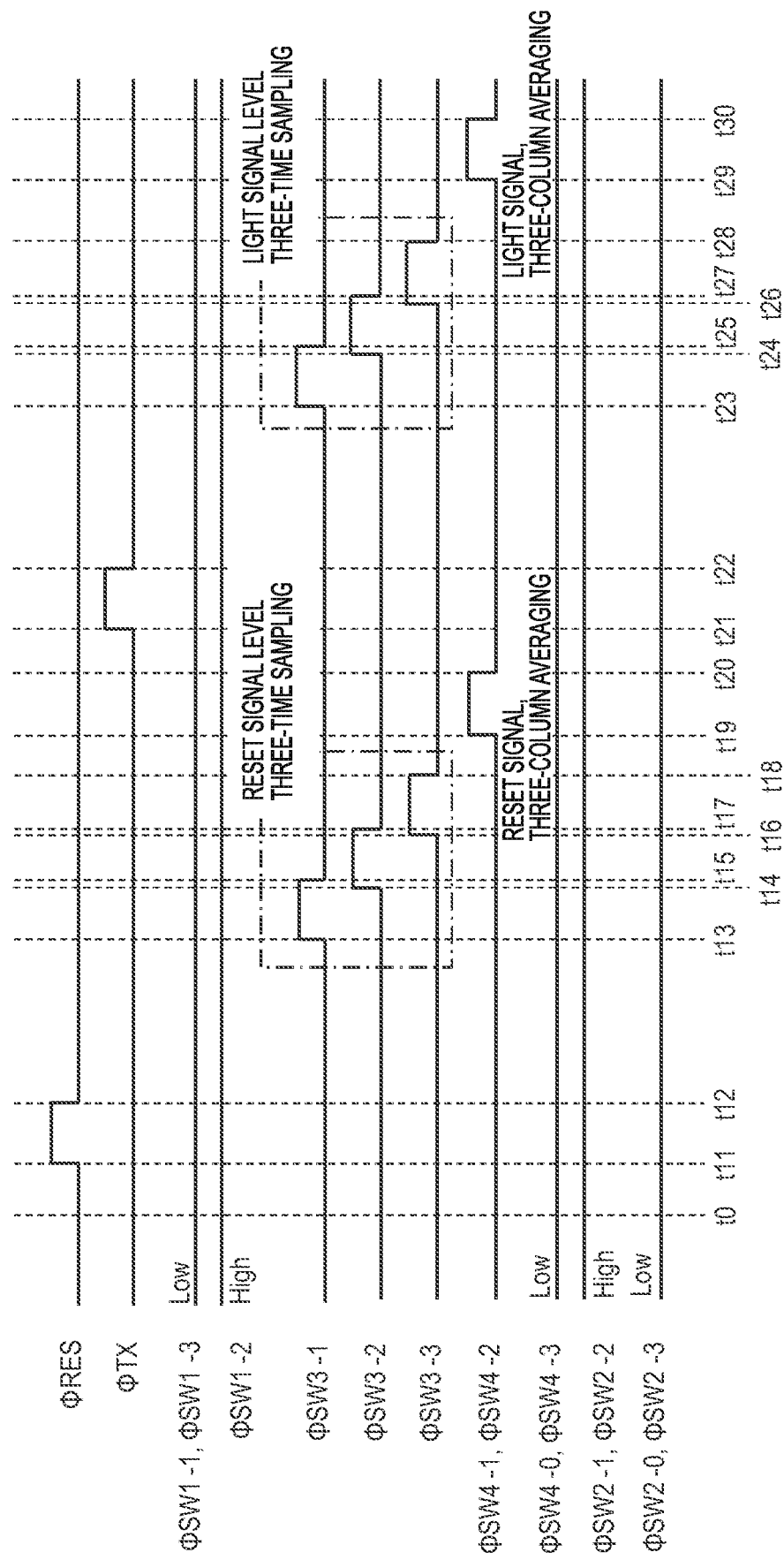

A solid-state imaging device and a method of driving the same according to a first embodiment of the present invention will be described with reference to FIG. 1 to FIG. 6. FIG. 1 is a block diagram illustrating a general configuration of a solid-state imaging device according to the present embodiment. FIG. 2 is a circuit diagram illustrating a configuration example of a pixel in the solid-state imaging device according to the present embodiment. FIG. 3 is a circuit diagram illustrating a configuration example of a readout circuit in the solid-state imaging device according to the present embodiment. FIG. 4 to FIG. 6 are timing diagrams illustrating methods of driving the solid-state imaging device according to the present embodiment.

First, the structure of the solid-state imaging device according to the present embodiment will be described with reference to FIG. 1 to FIG. 3.

As illustrated in FIG. 1, the solid-state imaging device 100 according to the present embodiment includes a pixel array unit 10, a vertical scanning circuit 20, a readout circuit unit 30, an analog-to-digital (AD) conversion circuit unit 40, a column memory unit 50, a horizontal scanning circuit 60, an output circuit 70, and a control circuit 80. Further, the solid-state imaging device 100 further includes a ramp signal generation unit 44 and a counter 54.

In the pixel array unit 10, a plurality of pixels 12 arranged in a matrix over a plurality of rows and a plurality of columns are provided. In FIG. 1, while 16 pixels 12 arranged in 4 rows by 4 columns out of the pixels 12 forming the pixel array unit 10 are illustrated, the number of pixels 12 forming the pixel array unit 10 is not particularly limited.

On each row of the pixel array unit 10, a control line 14 extending in a first direction (the horizontal direction in FIG. 1) is arranged. Each of the control lines 14 is connected to the pixels 12 aligned in the first direction, respectively, to form a signal line common to these pixels 12. The first direction in which the control line 14 extends may be referred to as a row direction or the horizontal direction. The control line 14 is connected to the vertical scanning circuit 20.

On each column of the pixel array unit 10, an output line 16 extending in a second direction (the vertical direction in FIG. 1) crossing the first direction is arranged. Each of the output lines 16 is connected to the pixels 12 aligned in the second direction, respectively, to form a signal line common to these pixels 12. The second direction in which the output line 16 extends may be referred to as a column direction or the vertical direction. The output line 16 is connected to the readout circuit unit 30. The output line 16 is connected to a current source 18 used for suppling a bias current to a readout circuit in the pixels 12.

The vertical scanning circuit 20 is a control circuit unit that supplies control signal to the pixels 12 via the control lines 14 provided on a row basis in a pixel array unit 10, and the control signals are used for driving readout circuits inside the pixels 12 when reading out a signal from each of the pixels 12. The vertical scanning circuit 20 may be formed by using a shift register or an address decoder.

The readout circuit unit 30 is a function block that performs a predetermined process on a signal read out from the pixel array unit 10. The readout circuit unit 30 has a plurality of input terminals and a plurality of output terminals, and the number of input terminals and the number of output terminals correspond to the number of columns in the pixel array unit 10. Each of the plurality of input terminals is connected to the output line 16 on a corresponding column. Each of the plurality of output terminals is connected to the corresponding output line 34. Note that the specific configuration of the readout circuit unit 30 will be illustrated below.

The AD conversion circuit unit 40 is a column-parallel AD converter and includes a plurality of comparators 42 in association with respective columns of the pixel array unit 10. Each of the comparators 42 has two input terminals and one output terminal. The two input terminals of the comparator 42 are connected to the output line 34 on the corresponding column and the ramp signal generation unit 44. The ramp signal generation unit 44 supplies a reference signal (ramp signal) to the comparator 42 on each column. The ramp signal is a signal whose level gradually increases or decreases from a predetermined value as time elapses.

The column memory unit 50 includes a plurality of memories 52 in association with respective columns of the pixel array unit 10. The memory 52 on each column is connected to the output terminal of the comparator 42 on the corresponding column and the counter 54.

The horizontal scanning circuit 60 is a circuit unit that supplies control signals used for outputting the pixel signals stored in the memories 52 of respective columns to the memories 52 on respective columns sequentially on a column basis. The control line of the horizontal scanning circuit 60 provided in association with each column of the pixel array unit 10 is connected to the memory 52 on the corresponding column. When the memory 52 on each column receives the control signal via a control line on the corresponding column of the horizontal scanning circuit 60, the memory 52 outputs the held pixel signal to the output circuit 70 via a horizontal output line 56. The output circuit 70 may include a signal processing unit that performs a process such as correlated double sampling (CDS) on the pixel signal read out from the memory 52 on each column. The output circuit 70 may further include an external interface such as a low voltage differential signaling (LVDS).

The control circuit 80 is a circuit unit that supplies, to the vertical scanning circuit 20, the readout circuit unit 30, the ramp signal generation unit 44, the counter 54, and the horizontal scanning circuit 60, the control signal used for controlling the operations or the timings thereof. At least some of these control signals may be supplied from the outside of the solid-state imaging device 100.

As illustrated in FIG. 2, each of the pixels 12 may be formed of a photoelectric converter PD, a transfer transistor M1, a reset transistor M2, an amplifier transistor M3, and a select transistor M4, for example.

The photoelectric converter PD is a photodiode, for example, and has the anode connected to a ground node, and the cathode connected to the source of the transfer transistor M1. The drains of the transfer transistor M1 is connected to the source of the reset transistor M2 and the gate of the amplifier transistor M3. The connection node of the drains of the transfer transistor M1, the source of the reset transistor M2, and the gate of the amplifier transistor M3 is a so-called floating diffusion FD. The floating diffusion FD includes a capacitance component (floating diffusion capacitor) and has a function as a charge holding portion.

The drain of the reset transistor M2 and the drain of the amplifier transistor M3 are connected to a power supply node to which a voltage Vdd is supplied. The source of the amplifier transistor M3 is connected to the drain of the select transistor M4. The source of the select transistor M4 is connected to the output line 16. The output line 16 is connected to a current source 18.

In the case of the pixel configuration illustrated in FIG. 2, the control line 14 on each row arranged in the pixel array unit 10 includes signal lines TX, RES, and SEL. The signal line TX is connected to the gates of the transfer transistors M1 of the pixels 12 belonging to the corresponding row, respectively, to form a signal line common to these pixels 12. The signal line RES is connected to the gates of the reset transistors M2 of the pixels 12 belonging to the corresponding row, respectively, to form a signal line common to these pixels 12. The signal line SEL is connected to the gates of the select transistors M4 of the pixels 12 belonging to the corresponding row, respectively, to form a signal line common to these pixels 12.

A control signal ϕTX that is a drive pulse for controlling the transfer transistor M1 is output from the vertical scanning circuit 20 to the signal line TX. A control signal ϕRES that is a drive pulse for controlling the reset transistor M2 is output from the vertical scanning circuit 20 to the signal line RES. A control signal ϕSEL that is a drive pulse for controlling the select transistor M4 is output from the vertical scanning circuit 20 to the signal line SEL. When each transistor is formed of an n-channel transistor, the corresponding transistor is in an on-state when the control signal at a High level (H level) is supplied from the vertical scanning circuit 20. Further, the corresponding transistor is in an off-state when the control signal at a Low level (L level) is supplied from the vertical scanning circuit 20.

The photoelectric converter PD converts (photoelectrically converts) an incident light to an amount of charge in accordance with the light amount of the incident light and accumulates the generated charge. When turned on, the transfer transistor M1 transfers charge held in the photoelectric converter PD to the floating diffusion FD. The floating diffusion FD has a voltage in accordance with the amount of charge transferred from the photoelectric converter PD by charge-to-voltage conversion caused by the capacitance of the floating diffusion FD. The amplifier transistor M3 is configured such that the voltage Vdd is supplied to the drain and a bias current is supplied to the source from the current source 18 via the select transistor M4 and forms an amplifier unit in which the gate is the input node (source follower circuit). Thereby, the amplifier transistor M3 outputs a signal based on the voltage of the floating diffusion FD to the output line 16 via the select transistor M4. When turned on, the reset transistor M2 resets the floating diffusion FD to a voltage corresponding to the voltage Vdd.

The transfer transistor M1, the reset transistor M2, and the select transistor M4 in the pixels 12 are controlled by the control signals ϕTX, ϕRES, and ϕSEL supplied from the vertical scanning circuit 20 on a row basis as described above. Pixel signals of the pixels 12 belonging to the row selected by the control signal ϕSEL are output to the corresponding output line 16 of respective pixels 12 at the same time.

A predetermined process is performed on the pixel signal output to the output line 16 in the readout circuit unit 30, and the processed pixel signal is then output to the AD conversion circuit unit 40 via the output line 34 on the corresponding column. Note that a signal process in the readout circuit unit 30 will be described later.

The pixel signal input to the AD conversion circuit unit 40 and a reference signal supplied from the ramp signal generation unit 44 (ramp signal) are input to the comparator 42. The comparator 42 performs a comparison operation to compare a signal level of the pixel signal with a signal level of the reference signal and outputs a latch signal at a timing when a relationship between the signal level of the pixel signal and the signal level of the ramp signal is inverted.

A count signal supplied from the counter 54 and an output signal of the comparator 42 are input to the memory 52. The memory 52 stores, as digital data of the pixel signal, a count value indicated by the count signal at the timing when the latch signal is received from the comparator 42.

The horizontal scanning circuit 60 outputs a control signal to the memory 52 sequentially on a column basis. The memory 52 that has received the control signal from the horizontal scanning circuit 60 outputs digital data, which has been digitally converted from a pixel signal, to the output circuit 70 via the horizontal output line 56. The output circuit 70 performs predetermined signal processing such as digital CDS on digital data of the pixel signal output from the column memory unit 50 and then externally outputs, via an external interface, the pixel signal on which the signal processing has been performed.

Next, a configuration example of the readout circuit unit 30 will be described with reference to FIG. 3. In FIG. 3, in a circuit configuration of the readout circuit unit 30, only three neighboring columns out of a plurality of columns forming the pixel array unit 10 are illustrated. Other columns (not illustrated) can be formed of the same repetition structure. Further, for easier understanding of the connection relationship with other components, some pixels 12 and the AD conversion circuit unit 40 are illustrated together.

The readout circuit unit 30 includes switches SW1, switches SW3, and capacitors Csh in association with respective columns of the pixel array unit 10. The switch SW1 and the switch SW3 are switches that control the connection state of the signal path between the output line 16 and the comparator 42 on each column and are connected between the output line 16 and the comparator 42 in series. A wiring that connects the switch SW3 to the comparator 42 is also the output line 34. The capacitor Csh is a sample-hold capacitor for temporarily holding a pixel signal read out from the pixels 12. One of the primary nodes of the switch SW1 is connected to the output line 16. The switch SW1 is a switch whose connection state (conduction/non-conduction) is controlled by a control signal φSW1 supplied to the control node. The other primary node of the switch SW1 is connected to one of the primary nodes of the switch SW3. The switch SW3 is a switch whose connection state (conduction/non-conduction) is controlled by a control signal φSW3 supplied to the control node. The other primary node of the switch SW3 is connected to one of the nodes of the capacitor Csh and one of the input terminals of the comparator 42. The other node of the capacitor Csh is connected to a reference voltage node.

The readout circuit unit 30 further includes switches SW2, each of which is connected between the connection nodes, each of which is between the switch SW1 and the switch SW3, on neighboring columns. The switch SW2 is a switch whose connection state (conduction/non-conduction) is controlled by a control signal φSW2 supplied to the control node. The readout circuit unit 30 further includes switches SW4, each of which is connected between the connection nodes, each of which is between the switch SW3, the capacitor Csh, and the comparator 42, on neighboring columns. The switch SW4 is a switch whose connection state (conduction/non-conduction) is controlled by a control signal φSW4 supplied to the control node.

Herein, each of the switches SW1, SW2, SW3, and SW4 is turned on (in a conductive state) when the control signal supplied to the control node is at the H level, and is turned off (in a non-conductive state) when the control signal supplied to the control node is at the L level. Note that the relationship between the control signal level and connection state of the switch may be opposite.

In FIG. 3, to distinguish the same component on each column, a reference denoting a column number is attached to the reference of the switches SW1, SW2, SW3, and SW4, the capacitor Csh, the output lines 16 and 34, and the comparator 42. For example, in FIG. 3, the switches SW1 and SW3, and the capacitor Csh on the left column are labeled with references "SW1-1", "SW3-1", and "Csh-1". In FIG. 3, the switches SW1 and SW3, and the capacitor Csh on the right column are labeled with references "SW1-3", "SW3-3", and "Csh-3". Further, in FIG. 3, the switches SW2 and SW4 between the left column and the center column are labeled with references "SW2-1" and "SW4-1". In FIG. 3, the switches SW2 and SW4 between the center column and the right column are labeled with references "SW2-2" and "SW4-2". Note that a reference denoting a column number may also be labeled for other components by the same rule.

Next, a method of driving the solid-state imaging device according to the present embodiment will be described with reference to FIG. 4 to FIG. 6. FIG. 4 to FIG. 6 are timing diagrams illustrating methods of driving the solid-state imaging device according to the present embodiment.

First, as a first drive example of the solid-state imaging device according to the present embodiment, a drive method when signals on all the columns are read out respectively will be described with reference to FIG. 4. Note that such driving may be applied to a use such as still image capturing, for example.

In the first drive example, the switch SW1 is maintained in a conductive state, and the switches SW2 and SW4 are maintained in a non-conductive state. That is, the control signal φSW1-* is maintained at the H level, and the control signals φSW2-* and φSW4-* are maintained at the L level. Here, the symbol "*" is a wild card and indicates inclusion of switches on all the columns.

At time t0 before the start of a readout operation, the control signals φRES, φTX, φSW3-1, φSW3-2, and φSW3-3 are at the L level. Further, as illustrated above, the control signal φSW1-* is at the H level, and the control signals φSW2-* and φSW4-* are at the L level.

Next, in the period from time t11 to time t12, the vertical scanning circuit 20 controls the control signal φRES to the H level. Thereby, in this period, the reset transistors M2 of the pixels 12 belonging to the corresponding row are turned on, and the floating diffusions FD are reset to a predetermined initial potential in accordance with the voltage Vdd. The amplifier transistor M3 outputs the pixel signal based on the potential of the floating diffusion FD to the output line 16 via the select transistor M4. The pixel signal is a signal in which reset noise is superimposed on a signal based on the initial potential of the floating diffusion FD (hereinafter, refers to as "reset signal").

Next, in the period from time t13 to time t15, the control circuit 80 controls the control signals φSW3-1, φSW3-2, and φSW3-3 supplied to the readout circuit unit 30 to the H level. Thereby, the switches SW3-1, SW3-2, and SW3-3 are turned on, and the output line 16 on each column is connected to the capacitor Csh on the corresponding column. Thus, the reset signal output to the output line 16 on each column is written in the capacitor Csh on the corresponding column.

In the subsequent period on and after time t15, the reset signal held in the capacitor Csh and the ramp signal supplied from the ramp signal generation unit 44 are compared by the comparator 42. Thereby, AD conversion of the reset signal is performed, and the digital data on which the AD conversion has been performed is written in the memory 52 on the corresponding column.

Next, in the period from time t21 to time t22 that is a timing when AD conversion of the reset signal is being performed, the vertical scanning circuit 20 controls the control signal φTX to the H level. Thereby, in this period, the transfer transistors M1 of the pixels 12 belonging to the corresponding row are turned on, and charge accumulated in the photoelectric converters PD are transferred to the floating diffusions FD. The floating diffusion FD has a potential in accordance with the amount of charge transferred from the photoelectric converter PD by charge-to-voltage conversion caused by the capacitance of the floating diffusion FD. The amplifier transistor M3 outputs the pixel signal based on the potential of the floating diffusion FD to the output line 16 via the select transistor M4. The pixel signal is a signal in which reset noise is superimposed on a signal based on the amount of charge transferred to the floating diffusion FD (hereinafter, refers to as "light signal").

Next, in the period from time t23 to time t25, the control circuit 80 controls the control signals ϕSW3-1, ϕSW3-2, and ϕSW3-3 supplied to the readout circuit unit 30 to the H level. Thereby, the switches SW3-1, SW3-2, and SW3-3 are turned on, and the output line 16 on each column is connected to the capacitor Csh on the corresponding column. Thus, the light signal output to the output line 16 on each column is written in the capacitor Csh on the corresponding column.

In the subsequent period on and after time t25, the light signal held in the capacitor Csh and the ramp signal supplied from the ramp signal generation unit 44 are compared by the comparator 42. Thereby, AD conversion of the light signal is performed, and the digital data on which the AD conversion has been performed is written in the memory 52 on the corresponding column.

The light signal and the reset signal held in the memory 52 are then output to the output circuit 70 via the horizontal output line 56 in response to the control signal from the horizontal scanning circuit 60. The light signal and the reset signal are differentially processed by a digital CDS process in the output circuit 70 and output from the solid-state imaging device as a digital pixel signal from which reset noise has been removed.

Note that the readout circuit unit 30 is not necessarily required to have the capacitor Csh. In such a case, as illustrated by the dotted line in FIG. 4, the control signals ϕSW3-1, ϕSW3-2, and ϕSW3-3 are maintained at the H level, and the switches SW3-1, SW3-2, and SW3-3 are maintained in a conductive state. Thereby, the pixel signal output to the output line 16 can be directly input to the comparator 42 and can be digitally converted.

Note that, in such a case, during the AD conversion of the reset signal, it is not possible to turn on the transfer transistor M1 and transfer charge of the photoelectric converter PD to the floating diffusion unit FD, that is, to start a light signal readout operation. This is because a light signal is added to the reset signal during the AD conversion, and an appropriate CDS process is no longer performed. Therefore, to obtain a high-quality sensor output signal on which the CDS process has been performed in this configuration, it is necessary to perform the light signal readout operation only after the end of AD conversion period of the reset signal, and it requires time for the readout operation.

That is, it is desirable that the readout circuit unit 30 have the sample-hold capacitor (capacitor Csh) and the switch SW3 on each column for disconnecting an output line 16 from the sample-hold capacitor (capacitor Csh) in order to reduce the total signal readout time. Note that, in this configuration, it is required that the AD conversion of the reset signal be completed before the switch SW3 is turned on in order to sample the light signal.

Next, a drive method when a high framerate (signal readout rate) is required although the resolution may be relatively low will be described. Note that such driving may be applied to a use such as moving image capturing, for example.

As a method for reducing the resolution, while there is a method in which a signal is compressed in a post-stage image processing IC without changing the output signal from the solid-state imaging device, a method of "reducing" readout columns will be described here assuming a case where a higher framerate is required. As driving for reducing the resolution inside the solid-state imaging device, while column reduction and row reduction are performed at the same time in many cases, since row reduction is not related to the primary feature of the present invention, description of row reduction will be omitted here. Note that column reduction in the present invention may be performed independently or along with row reduction.

When columns are reduced to have lower resolution in order to meet a moving image format, for the plurality of columns forming the pixel array unit 10, driving in which only one column signal of every three columns is read out (two of three columns are not read out) is performed, for example. For example, when only the signal on the center column out of the three columns in FIG. 3 is read out, the operation on such column is not different from the operation to read out all the columns. At this time, since the signal on the left column and the signal on the right column in FIG. 3 are not read out, the capacitors Csh-1 and Csh-3 and the comparators 42-1 and 42-3 on these columns do not contribute to readout of signals.

As a second drive example of the solid-state imaging device according to the present embodiment, a drive method when signals on only the center column in FIG. 3 are read out will be described with reference to FIG. 5. In the second drive example of the present embodiment, by using the switches SW2 and SW4, unlike the simple column reduction described above, it is possible to use the capacitor Csh-1 or Csh-3 or the comparator 42-1 or 42-3 on a column not used for readout of signals. Note that an example of using the comparators 42-1 and 42-3 will be described in the fifth embodiment.

In the second drive example, the switches SW1, SW2, and SW3 form a switch circuit that operates so as to hold pixel signals output from the pixels 12 in a plurality of signal holding units (capacitors), respectively, in sampling periods different from each other, as described later. Specifically, the switch circuit is configured to selectively connect the pixels 12 to the plurality of signal holding units (capacitors Csh-1, Csh-2, Csh-3), respectively. Herein, the expression "selectively connect" refers to a state of connecting to some of the plurality of signal holding units and not connecting to the other. Further, the expression "a plurality of signal holding units" refers to a plurality of signal holding units corresponding to a certain pixel 12, and it is not required to be able to connect to all the signal holding units included in the solid-state imaging device. Further, the switch SW4 is a switch circuit for switching the connection between the plurality of signal holding units and the AD conversion unit. In the present embodiment, the switches SW4 form the switch circuit that operates so as to average pixel signals held in a plurality of signal holding units (capacitors) and supply the average to the AD conversion unit.

In the second drive example, the switch SW1-2 is maintained in a conductive state, and the switches SW1-1 and SW1-3 are maintained in a non-conductive state. That is, the control signal ϕSW1-2 is maintained at the H level, and the control signals ϕSW1-1 and ϕSW1-3 are maintained at the L level. This is because the pixel signal from the output line 16-2 on the central column is read out, and the pixel signal from the output line 16-1 on the right column and the pixel signal from the output line 16-3 on the left column which are not required to be read out are shut off.

Further, in the second drive example, the switches SW2-1 and SW 2-2 are maintained in a conductive state. That is, the control signals φSW2-1 and φSW2-2 are maintained at the H level. This is because the pixel signals read out from the output line 16-2 on the center column can also be written in the capacitor Csh-1 on the left column and the capacitor Csh-3 on the right column.

Note that, in the second drive example, since readout is performed with three columns defined as one unit block, the switches SW2 and SW4 (switches SW2-0, SW2-3, SW4-0, SW4-3 in FIG. 3) connected between these unit blocks are maintained in a non-conductive state. That is, the control signals φSW2-0, φSW2-3, φSW4-0, and φSW4-3 are maintained at the L level.

At time t0 before the start of a readout operation, the control signals φRES, φTX, φSW3-1, φSW3-2, φSW3-3, φSW4-1, and φSW4-2 are at the L level. Further, as illustrated above, the control signals φSW1-2, φSW 2-1, and φSW 2-2 are at the H level, and the control signals φSW1-1, φSW 1-3, φSW2-0, φSW 2-3, φSW 4-0, and φSW4-3 are at the L level.

Next, in the period from time t11 to time t12, the vertical scanning circuit 20 controls the control signal φRES to the H level. Thereby, in this period, the reset transistors M2 of the pixels 12 belonging to the corresponding row are turned on, and the floating diffusions FD are reset to a predetermined initial potential in accordance with the voltage Vdd. The amplifier transistor M3 outputs the pixel signal based on the potential of the floating diffusion FD to the output line 16 via the select transistor M4. The pixel signal is a signal in which reset noise is superimposed on a signal based on the initial potential of the floating diffusion FD (reset signal).

Next, at time t13, the control circuit 80 controls the control signals φSW3-1, φSW3-2, and φSW3-3 supplied to the readout circuit unit 30 to the H level. Thereby, the switches SW3-1, SW3-2, and SW3-3 are turned on, and the output line 16-2 on the center column is connected to the capacitors Csh-1, Csh-2, and Csh-3 on three columns of the unit block. Thus, the reset signals output to the output line 16-2 is written in the capacitors Csh-1, Csh-2, and Csh-3, respectively.

Next, the control circuit 80 sequentially controls the control signal φSW3-1 at time t15, the control signal φSW3-2 at time t17, and the control signal φSW3-3 at time t18 to the L level. Thereby, the switches SW3-1, SW3-2, and SW3-3 are turned off sequentially at constant time intervals.

Accordingly, the reset signal output from the output line 16-2 can be held in the capacitors Csh-1, Csh-2, and Csh-3, respectively, as three reset signals sampled and held during different sampling periods. Although the three reset signals sampled and held in the capacitors Csh-1, Csh-2, and Csh-3 are basically the same signal as a DC component, time dependent noise components in accordance with respective sampling periods are superimposed on the DC component. Examples of the time dependent noise component may be so-called random noise or random telegraph noise mainly caused by the amplifier transistor M3.

Next, in the period from time t19 to time t20, the control circuit 80 controls the control signals φSW4-1 and φSW4-2 supplied to the readout circuit unit 30 to the H level. Thereby, in this period, the switches SW4-1 and SW4-2 are turned on, and the three reset signals described above are added and averaged in the capacitors Csh-1, Csh-2, and Csh-3. Thereby, as with the first drive example, random noise superimposed on the reset signal output from the same pixel 12 can be suppressed to $1/\sqrt{3}$ times that obtained when readout is performed on a column basis.

In the subsequent period on and after time t20, the comparator 42-2 compares the reset signal held in the capacitor Csh-2 with the ramp signal supplied from the ramp signal generation unit 44. Thereby, AD conversion of the reset signal is performed, and the digital data on which the AD conversion has been performed is written in the memory 52 on the center column.

Next, in the period from time t21 to time t22 that is a timing when AD conversion of the reset signal is being performed, the vertical scanning circuit 20 controls the control signal φTX to the H level. Thereby, in this period, the transfer transistors M1 of the pixels 12 belonging to the corresponding row are turned on, and charge accumulated in the photoelectric converters PD are transferred to the floating diffusions FD. The floating diffusion FD has a potential in accordance with the amount of charge transferred from the photoelectric converter PD by charge-to-voltage conversion caused by the capacitance of the floating diffusion FD. The amplifier transistor M3 outputs the pixel signal based on the potential of the floating diffusion FD to the output line 16 via the select transistor M4. The pixel signal is a signal in which reset noise is superimposed on a signal based on the amount of charge transferred to the floating diffusion FD (light signal).

Next, at time t23, the control circuit 80 controls the control signals φSW3-1, φSW3-2, and φSW3-3 supplied to the readout circuit unit 30 to the H level. Thereby, the switches SW3-1, SW3-2, and SW3-3 are turned on, and the output line 16-2 on the center column is connected to the capacitors Csh-1, Csh-2, and Csh-3 on three columns of a unit block. Thus, the light signal output to the output line 16-2 is written in the capacitors Csh-1, Csh-2, and Csh-3, respectively.

Next, the control circuit 80 sequentially controls the control signal φSW3-1 at time t25, the control signal φSW3-2 at time t27, and the control signal φSW3-3 at time t28 to the L level. Thereby, the switches SW3-1, SW3-2, and SW3-3 are turned off sequentially at constant time intervals.

Thereby, the light signal output from the output line 16-2 can be held in the capacitors Csh-1, Csh-2, and Csh-3, respectively, as three light signals sampled and held in different sampling periods. Although the three light signals sampled and held in the capacitors Csh-1, Csh-2, and Csh-3 are basically the same signal as a DC component, as with the reset signal, time dependent noise components in accordance with respective sampling periods are superimposed on the DC component.

Next, in the period from time t29 to time t30, the control circuit 80 controls the control signals φSW4-1 and φSW4-2 supplied to the readout circuit unit 30 to the H level. Thereby, in this period, the switches SW4-1 and SW4-2 are turned on, and the three light signals described above are added and averaged in the capacitors Csh-1, Csh-2, and Csh-3. Thereby, as the first drive example, random noise superimposed to the light signal output from the same pixel 12 can be suppressed to $1/\sqrt{3}$ times that obtained when readout is performed on a column basis.

In the subsequent period on and after time t30, the comparator 42-2 compares the light signal held in the capacitor Csh-2 with the ramp signal supplied from the ramp signal generation unit 44. Thereby, AD conversion of the light signal is performed, and the digital data on which the AD conversion has been performed is written in the memory 52 on the center column.

The light signal and the reset signal held in the memory 52 are then output to the output circuit 70 via the horizontal output line 56 in response to the control signal from the horizontal scanning circuit 60. The light signal and the reset signal are differentially processed by a digital CDS process in the output circuit 70 and output from the solid-state imaging device as a digital pixel signal from which reset noise has been removed.

As described above, according to the second drive example of the present embodiment, random noise resulted from a pixel can be suppressed to $1/\sqrt{3}$ times without requiring additional elements other than some switches and without causing an increase in power consumption. Typically, since the layout area occupied by a switch is smaller than the layout area of an analog element such as a sample-hold capacitor or a transistor used in a comparator, addition of a switch less affects the increase in the area of the readout circuit unit 30. It is therefore possible to realize the advantage described above while suppressing influence on the readout circuit unit of the solid-state imaging device whose layout area is highly restricted.

Note that, at time t15, t17, and t18 and at time t25, t27, and t28, the intervals of timings when the switches SW3-1, SW3-2, and SW3-3 are sequentially turned off may be any interval as long as it is long enough to at least eliminate the influence of signal fluctuations caused by the previously driven switch. As for the direction of increasing the intervals of timings when the switches SW3-1, SW3-2 and SW3-3 are turned off, there is no problem in increasing the interval as long as the signal readout time permits.

Further, in the second drive example, at time t13 and time t23, while the switches SW3-1, SW3-2, and SW3-3 are turned on at the same time, the timings when the switches SW3-1, SW3-2, and SW3-3 are turned on are not necessary required to be the same. That is, it is only necessary to ensure a period in which each of the switches SW3-1, SW3-2, and SW3-3 is in an on-state for the time required for writing the pixel signal to the capacitor Csh, and it is not essential that the switches SW3-1, SW3-2, and SW3-3 be simultaneously turned on.

For example, as with a third drive example illustrated in FIG. 6, the switches SW3-1, SW3-2, and SW3-3 may be sequentially turned on at time t13, t14, and t16, respectively, and at time t23, t24, and t26, respectively. Note that, in the third drive example, while periods during which the switches SW3-1, SW3-2, and SW3-3 are turned on are partially overlapped, periods during which the switches SW3-1, SW3-2, and SW3-3 are turned on may not be overlapped.

In other words, the sampling periods in the capacitors Csh-1, Csh-2, and Csh-3 may have the same start time and different end time, and both the start time and the end time may be different from each other.

Further, in the second and third drive examples, although an example in which the number of times of sampling is three is illustrated, the number of times of sampling may be two. For example, when it is difficult to set the number of times of sampling to three due to restrictions on the readout time or the like, two out of the three sample-hold capacitors may be used to set the number of times of sampling to two. In such a case, although the effect is reduced compared to the case where the number of times of sampling is three, random noise can be suppressed compared to the case where readout is performed on a column basis as with the first drive example.

Further, in the second and third drive examples, although the drive examples are configured such that only one column of every three columns is read out, the drive examples may be configured such that one column from a unit block including four or more columns may be read out. In such a case, although the resolution is further reduced, it is possible to perform sampling and signal-smoothing, in which the number of times thereof corresponds to the number of columns included in the unit block, and the effect of reducing random noise can be further enhanced. Also in such a case, the number of times of sampling may be two or more and can be changed as appropriate in accordance with restrictions on the readout time or the like.

Further, in the second and third drive examples, the AD conversion processes on the reset signal and the light signal are not necessarily required to be performed after the switches SW4-1 and SW4-2 are turned off and may be performed in a state where the switches SW4-1 and SW4-2 are in the on-state. In such a case, the switches SW4-1 and SW4-2 may be turned off before the switch SW3 is next turned on.

As described above, according to the present embodiment, it is possible to reduce noise superimposing on a pixel signal when performing readout driving with reduced resolution, while suppressing an increase in the area or an increase in power consumption of the readout circuit unit.

Second Embodiment

Figure 7:
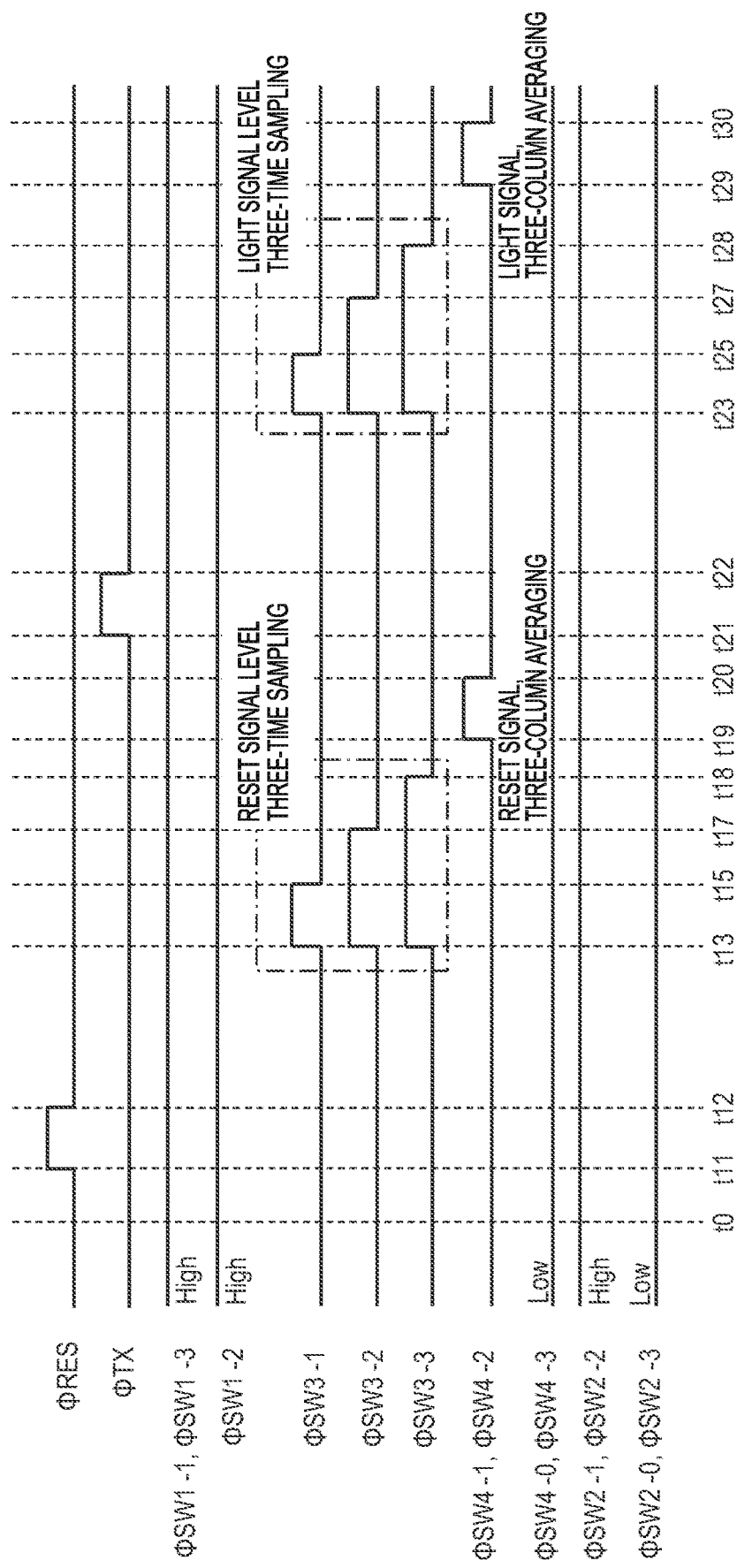
FIG. 7 is a timing diagram illustrating a method of driving a solid-state imaging device according to a second embodiment of the present invention.

A method of driving a solid-state imaging device according to a second embodiment of the present invention will be described with reference to FIG. 7. The same component as that of the solid-state imaging device according to the first embodiment is labeled with the same reference, and the description thereof will be omitted or simplified. FIG. 7 is a timing diagram illustrating the method of driving the solid-state imaging device according to the present embodiment.

In the present embodiment, another method of driving the solid-state imaging device according to the first embodiment illustrated with reference to FIG. 1 to FIG. 3 will be described.

The method of driving the solid-state imaging device according to the present embodiment is the same as the second drive example (FIG. 5) of the first embodiment except that the control signals ϕSW1-1 and ϕSW1-3 are maintained at the H level, as illustrated in FIG. 7.

In the present drive example, readout of the pixel signal is performed while the switches SW1-1 and SW1-3 are also maintained to be turned on as with the switch SW1-2. In this driving, the output lines 16-1, 16-2, and 16-3 on columns included in a unit block, which is a basic unit of column reduction, are always connected via the switches SW1-1, SW1-2, SW1-3, SW2-1, and SW2-2.

With such a configuration, pixel signals that are simultaneously read out to the output lines 16-1, 16-2, and 16-3 are artificially averaged. Therefore, except when a difference between these pixel signals is extremely large, it is possible to further suppress noise superimposing on pixel signals compared to the case of the first embodiment. Further, since there is no pixel column on which information is reduced, an advantage of suppressed jaggy is expected for a high-contrast subject part.

The timing to drive the switches SW3-1, SW3-2, and SW3-3, the number of times of sampling, or the like can be appropriately changed in the same manner as in the case of the first embodiment.

As described above, according to the present embodiment, it is possible to reduce noise superimposing on a pixel signal when performing readout driving with reduced resolution, while suppressing an increase in the area or an increase in power consumption of the readout circuit unit.

Third Embodiment

Figure 8:
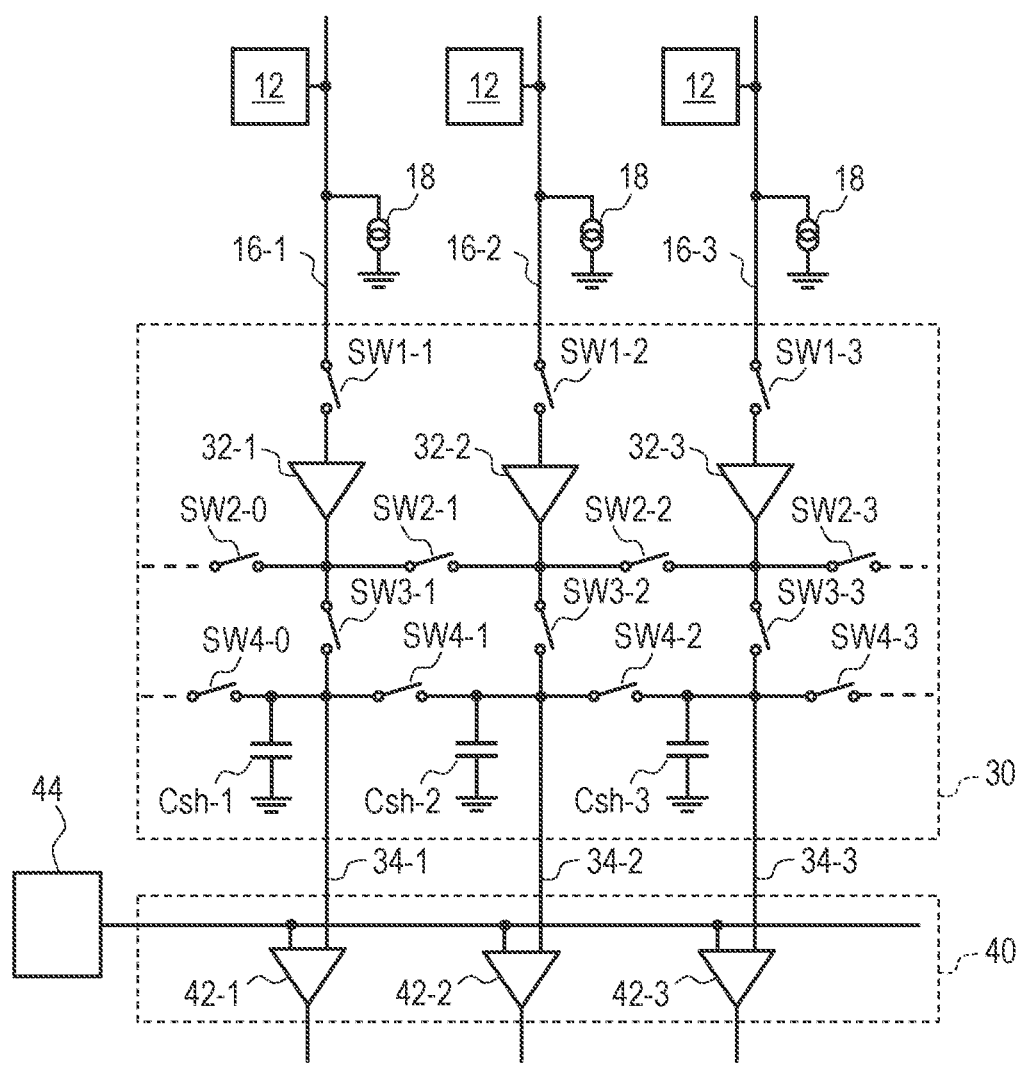
FIG. 8 is a circuit diagram illustrating a configuration example of a readout circuit unit in a solid-state imaging device according to a third embodiment of the present invention.

A solid-state imaging device according to a third embodiment of the present invention will be described with reference to FIG. 8. The same component as that of the solid-state imaging devices according to the first and second embodiments is labeled with the same reference, and the description thereof will be omitted or simplified. FIG. 8 is a circuit diagram illustrating a configuration example of a readout circuit unit in the solid-state imaging device according to the present embodiment.

The solid-state imaging device according to the present embodiment is the same as the solid-state imaging device according to the first embodiment except that the readout circuit unit 30 further includes column amplifiers 32 on respective columns, as illustrated in FIG. 8. The column amplifiers 32 are advantageous in terms of the SN ratio in particular when a pixel signal is required to be amplified and read out and thus are often arranged for an intended use of the solid-state imaging device.

The input terminal of the column amplifier 32 on each column is connected to the other primary node of the switch SW1. The output terminal of the column amplifier 32 on each column is connected to a connection node between the switch SW2 and one of the primary nodes of the switch SW3.

When specific description is provided with the components illustrated in FIG. 8, the input terminal of the column amplifier 32-1 is connected to the other primary node of the switch SW1-1. The output terminal of the column amplifier 32-1 is connected to the connection node between one of the primary nodes of the switch SW3-1, one of the primary nodes of the switch SW2-0, and one of the primary nodes of the switch SW2-1. The input terminal of the column amplifier 32-2 is connected to the other primary node of the switch SW1-2. The output terminal of the column amplifier 32-2 is connected to the connection node between one of the primary nodes of the switch SW3-2, the other primary node of the switch SW2-1, and one of the primary nodes of the switch SW2-2. The input terminal of the column amplifier 32-3 is connected to the other primary node of the switch SW1-3. The output terminal of the column amplifier 32-3 is connected to the connection node between one of the primary nodes of the switch SW3-3, the other primary node of the switch SW2-2, and one of the primary nodes of the switch SW2-3.

The solid-state imaging device according to the present embodiment can operate in accordance with the first drive example, the second drive example, or the third drive example of the first embodiment or in accordance with the drive example of the second embodiment. The solid-state imaging device according to the present embodiment is different from the first and second embodiments with respect to the signal readout operation in that a pixel signal is amplified by the column amplifier 32 before digitally converted by the AD conversion circuit unit 40. Other features are the same as the first or second embodiment. Note that, when performing the second drive example of the first embodiment to perform reduction of columns, it is desirable to control, for example, power down the column amplifiers 32 (column amplifiers 32-1 and 32-3) on the column not subjected to signal readout so that the output has a sufficiently high impedance.

As described above, according to the present embodiment, it is possible to reduce noise superimposing on a pixel signal when performing readout driving with reduced resolution, while suppressing an increase in the area or an increase in power consumption of the readout circuit unit.

Fourth Embodiment

A solid-state imaging device and a method of driving the same according to a fourth embodiment of the present invention will be described with reference to FIG. 9 and FIG. 10. The same component as that of the solid-state imaging devices according to the first to third embodiments is labeled with the same reference, and the description thereof will be omitted or simplified.

First, the structure of the solid-state imaging device according to the present embodiment will be described with reference to FIG. 9. FIG. 9 is a circuit diagram illustrating a configuration example of a readout circuit unit in the solid-state imaging device according to the present embodiment.

Figure 9:
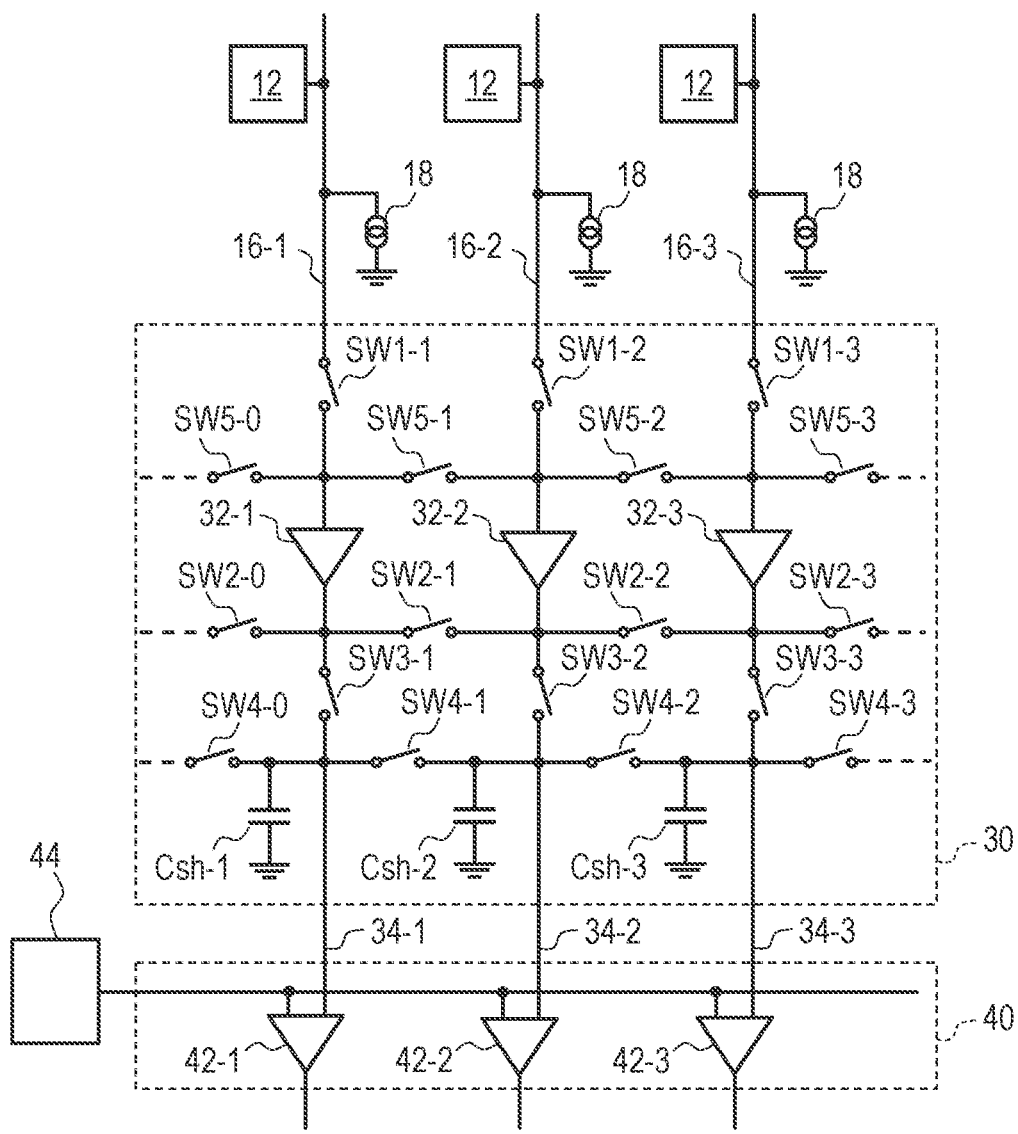
FIG. 9 is a circuit diagram illustrating a configuration example of a readout circuit unit in a solid-state imaging device according to a fourth embodiment of the present invention.

The solid-state imaging device according to the present embodiment is the same as the solid-state imaging device according to the third embodiment except that the readout circuit unit 30 further includes a switch SW5 connected between the connection node of the switch SW1 and the column amplifier 32 on neighboring columns, as illustrated in FIG. 9. The switch SW5 is a switch whose connection state (conduction/non-conduction) is controlled by a control signal φSW5 supplied to the control node thereof.

When specifically described with the components illustrated in FIG. 9, the switch SW5-1 is connected between the connection node of the switch SW1-1 and the column amplifier 32-1 and the connection node of the switch SW1-2 and the column amplifier 32-2. Further, the switch SW5-2 is connected between the connection node of the switch SW1-2 and the column amplifier 32-2 and the connection node of the switch SW1-3 and the column amplifier 32-3. The same applies to other neighboring columns.

Next, the method of driving the solid-state imaging device according to the present embodiment will be described with reference to FIG. 10. FIG. 10 is a timing diagram illustrating the method of driving the solid-state imaging device according to the present embodiment.

The solid-state imaging device according to the present embodiment can operate in accordance with the first drive example, the second drive example, or the third drive example of the first embodiment or in accordance with the drive example of the second embodiment. FIG. 10 illustrates a timing diagram when the drive example of the second embodiment is applied to the solid-state imaging device according to the present embodiment.

Figure 10:
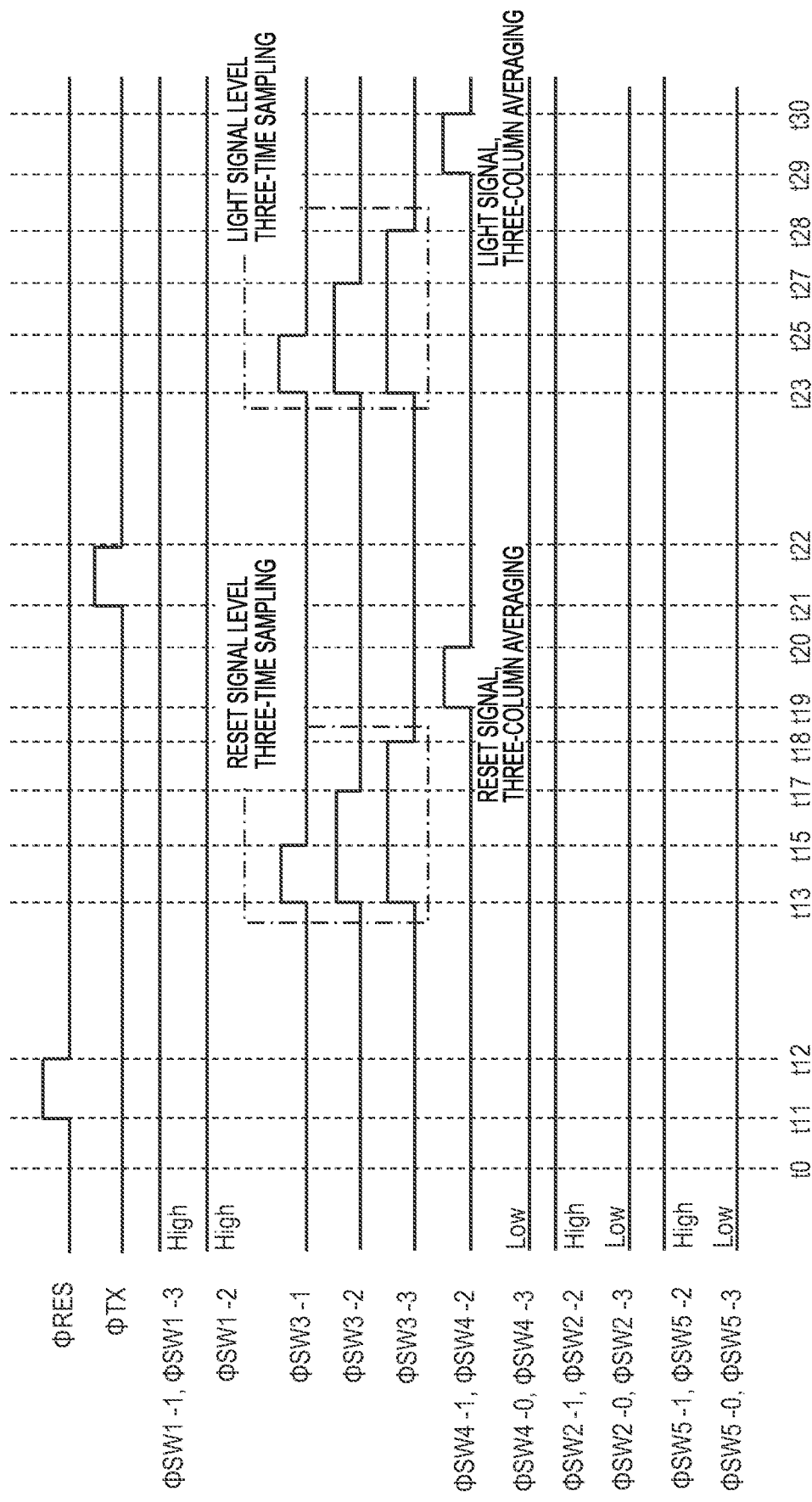
FIG. 10 is a timing diagram illustrating a method of driving the solid-state imaging device according to the fourth embodiment of the present invention.

The method of driving the solid-state imaging device according to the present embodiment is the same as the second drive example of the second embodiment (FIG. 7) except that the control signals φSW5-1 and SW5-2 are maintained at the H level and the control signals φSW5-0 and SW5-3 are maintained at the L level, as illustrated in FIG. 10.

In this drive example, readout of a pixel signal is performed with the switches SW1-1 and SW1-3 in addition to the switch SW1-2 being turned on in the same manner as in the second embodiment. In this driving, the output lines 16-1, 16-2, and 16-3 on columns included in a unit block, which is a basic unit of column reduction, are always connected via the switches SW1-1, SW1-2, SW1-3, SW5-1, and SW5-2.

With such a configuration, pixel signals that are simultaneously read out to the output lines 16-1, 16-2, and 16-3 are artificially averaged. Therefore, except when a difference between these pixel signals is extremely large, it is possible to further suppress noise superimposing on pixel signals compared to the case of the first embodiment. Further, since there is no pixel column on which information is reduced, an advantage of suppressed jaggy is expected for a high-contrast subject part.

The solid-state imaging device according to the present embodiment is different from the second embodiment with respect to the signal readout operation in that a pixel signal is amplified by the column amplifier 32 before digitally converted by the AD conversion circuit unit 40. Other features are the same as the first or second embodiment. Note that, when performing the second drive example of the first embodiment to perform reduction of columns, it is desirable to control, for example, power down the column amplifiers 32 (column amplifiers 32-1 and 32-3) on the column not subjected to signal readout so that the output has a sufficiently high impedance.

As described above, according to the present embodiment, it is possible to reduce noise superimposing on a pixel signal when performing readout driving with reduced resolution, while suppressing an increase in the area or an increase in power consumption of the readout circuit unit.

Fifth Embodiment

A method of driving a solid-state imaging device according to a fifth embodiment of the present invention will be described. The same component as that of the solid-state imaging devices according to the first to fourth embodiments is labeled with the same reference, and the description thereof will be omitted or simplified.

In the first to fourth embodiments, a pixel signal output from the pixel array unit 10 is held in the capacitors Csh-1, Csh-2, and Csh-3, respectively, as three pixel signals sampled and held during different sampling periods. Then, after pixel signals held in these respective capacitors Csh-1, Csh-2, and Csh-3 are smoothed (averaged), only the comparator 42-2 on the center column is used to perform AD conversion of the pixel signal.

In contrast, in the present embodiment, pixel signals smoothed (averaged) by using the capacitors Csh-1, Csh-2, and Csh-3 are digitally converted by using the comparators 42-1, 42-2, and 42-3, respectively. Then, digital data of three digitally converted pixel signals is again averaged in the post-stage output circuit to obtain output data of one pixel of the solid-state imaging device. With such a configuration, it is possible to obtain an advantage of reduction of noise resulted from the comparator 42 in addition to the advantage of reduction of random noise of pixel signals output from the pixels 12.

That is, the first to fourth embodiments are able to reduce random noise of pixel signals output from the pixels 12 but are unable to suppress noise resulted from the comparator 42. In contrast, in the drive method of the present embodiment, it is also possible to smooth (average) noise resulted from the comparator 42 and suppress this noise to $1/\sqrt{3}$ times, mathematically.

As described above, according to the present embodiment, it is possible to reduce noise superimposing on a pixel signal when performing readout driving with reduced resolution, while suppressing an increase in the area or an increase in power consumption of the readout circuit unit.

Note that, in the present embodiment, averaged pixel signals held in respective capacitors Csh-1, Csh-2, and Csh-3 are digitally converted, respectively, and then digital data of three digitally converted pixel signals are again averaged. However, pixel signals held in respective capacitors Csh-1, Csh-2, and Csh-3 may be directly digitally converted without being averaged, and then digital data of three digitally converted pixel signals may be averaged. Also with such a configuration, it is possible to reduce noise superimposing on a pixel signal while suppressing an increase in the area or an increase in power consumption of the readout circuit unit.

Sixth Embodiment

Figure 11:
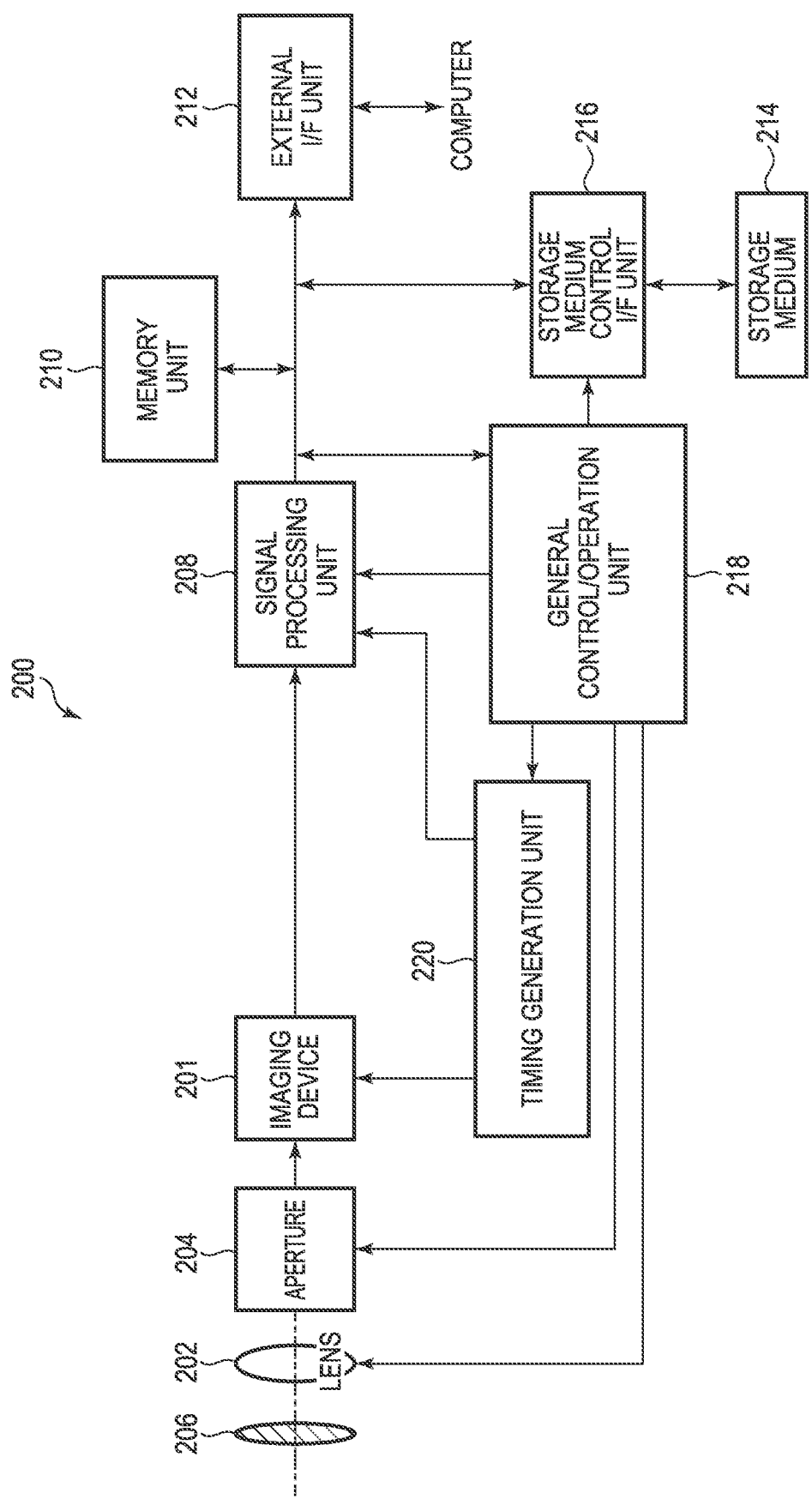
FIG. 11 is a block diagram illustrating a general configuration of an imaging system according to a sixth embodiment of the present invention.

An imaging system according to a sixth embodiment of the present invention will be described with reference to FIG. 11. FIG. 11 is a block diagram illustrating a general configuration of the imaging system according to the present embodiment.

The solid-state imaging devices 100 described in the above first to fifth embodiments are applicable to various imaging systems. An example of applicable imaging system may be a digital still camera, a digital camcorder, a surveillance camera, a copier machine, a fax machine, a mobile phone, an on-vehicle camera, an observation satellite, or the like. Further, a camera module having an optical system such as a lens and a solid-state imaging device is also included in the imaging system. FIG. 11 illustrates a block diagram of a digital still camera as one example of the above.

An imaging system 200 illustrated in FIG. 11 as an example includes an imaging device 201, a lens 202 that captures an optical image of a subject onto the imaging device 201, an aperture 204 for changing a light amount passing through the lens 202, and a barrier 206 for protecting the lens 202. The lens 202 and the aperture 204 form an optical system that converges a light onto the imaging device 201. The imaging device 201 is the solid-state imaging device 100 described in any of the first to fifth embodiments and converts an optical image captured by the lens 202 into image data.

The imaging system 200 further includes a signal processing unit 208 that performs processing on an output signal output from the imaging device 201. The signal processing unit 208 performs AD conversion to converts an analog signal output by the imaging device 201 into a digital signal. Further, the signal processing unit 208 performs operations to perform various correction or compression in addition to the above, if necessary, and output image data. The AD conversion unit that is a part of the signal processing unit 208 may be formed on a semiconductor substrate on which the imaging device 201 is provided or may be formed on a different semiconductor substrate from the substrate on which the imaging device 201 is provided. Alternatively, the imaging device 201 and the signal processing unit 208 may be formed on the same semiconductor substrate.

Further, the imaging system 200 includes a memory unit 210 for temporarily storing image data therein and an external interface unit (external I/F unit) 212 for communicating with an external computer or the like. The imaging system 200 further includes a storage medium 214 such as a semiconductor memory for performing storage or readout of imaging data and a storage medium control interface unit (storage medium control I/F unit) 216 for performing storage or readout on the storage medium 214. Note that the storage medium 214 may be embedded in the imaging system 200 or may be removable.

Further, the imaging system 200 includes a general control/operation unit 218 that performs various calculation and controls the entire digital still camera and a timing generation unit 220 that outputs various timing signals to the imaging device 201 and the signal processing unit 208. Here, the timing signal or the like may be input from the outside, and the imaging system 200 may have at least the imaging device 201 and the signal processing unit 208 that processes an output signal output from the imaging device 201.

The imaging device 201 outputs an imaging signal to the signal processing unit 208. The signal processing unit 208 performs predetermined signal processing on the imaging signal output from the imaging device 201 and outputs image data. The signal processing unit 208 uses the imaging signal to generate an image.

As described above, according to the present embodiment, the imaging system to which the solid-state imaging device 100 according to the first to fifth embodiments is applied can be realized.

Seventh Embodiment

Figure 12A:
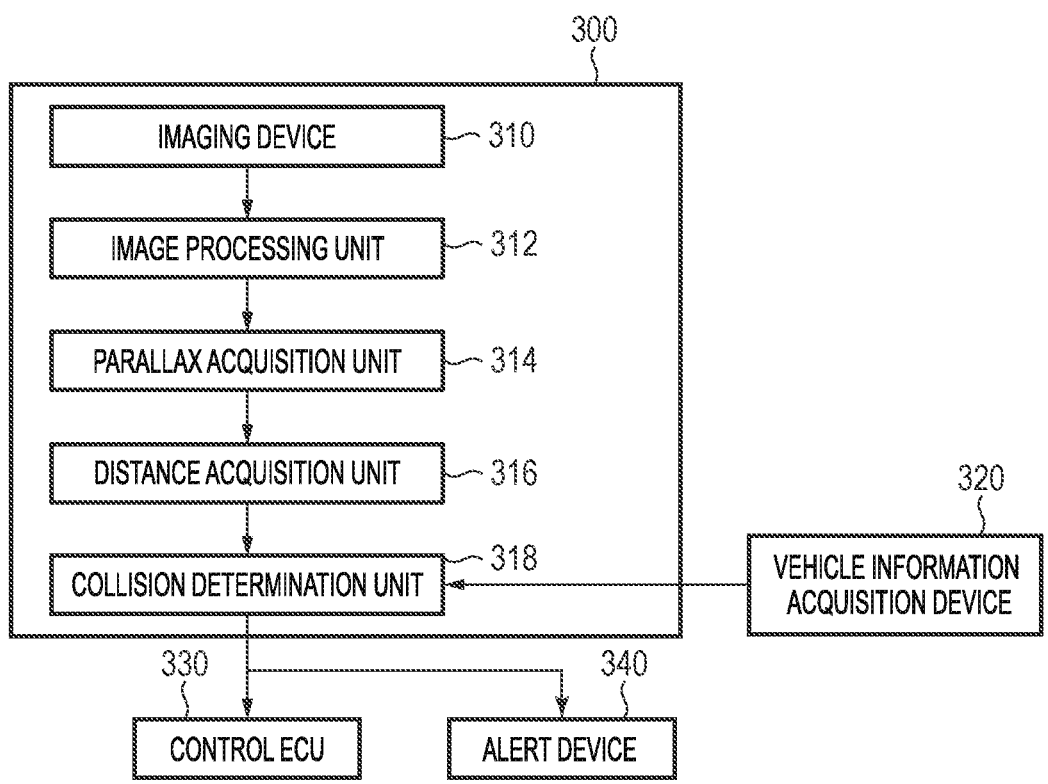
FIG. 12A is a diagram illustrating a configuration example of an imaging system according to a seventh embodiment of the present invention.
Figure 12B:
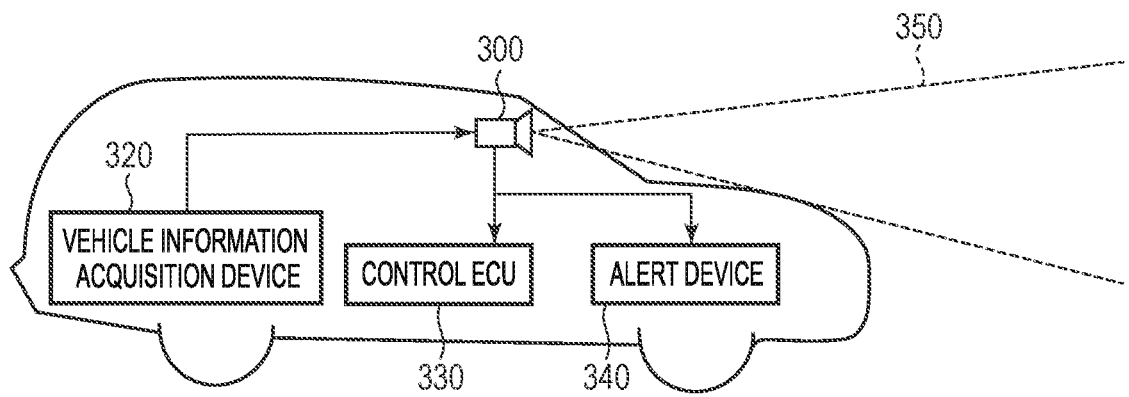
FIG. 12B is a diagram illustrating a configuration example of a movable object according to the seventh embodiment of the present invention.

An imaging system and a movable object according to a seventh embodiment of the present invention will be described with reference to FIG. 12A and FIG. 12B. FIG. 12A is a diagram illustrating a configuration of the imaging system according to the present embodiment. FIG. 12B is a diagram illustrating a configuration of the movable object according to the present embodiment.

FIG. 12A illustrates an example of an imaging system related to an on-vehicle camera. An imaging system 300 includes an imaging device 310. The imaging device 310 is the solid-state imaging device 100 described in any of the above first to fifth embodiments. The imaging system 300 includes an image processing unit 312 that performs image processing on a plurality of image data acquired by the imaging device 310 and a parallax acquisition unit 314 that calculates a parallax (a phase difference of parallax images) from the plurality of image data acquired by the imaging system 300. Further, the imaging system 300 includes a distance acquisition unit 316 that calculates a distance to the object based on the calculated parallax and a collision determination unit 318 that determines whether or not there is a collision possibility based on the calculated distance. Here, the parallax acquisition unit 314 and the distance acquisition unit 316 are an example of a distance information acquisition unit that acquires distance information on the distance to the object. That is, the distance information is information on a parallax, a defocus amount, a distance to an object, or the like. The collision determination unit 318 may use any of the distance information to determine the collision possibility. The distance information acquisition unit may be implemented by dedicatedly designed hardware or may be implemented by a software module. Further, the distance information acquisition unit may be implemented by a Field Programmable Gate Array (FPGA), an Application Specific Integrated Circuit (ASIC), or the like or may be implemented by a combination thereof.

The imaging system 300 is connected to the vehicle information acquisition device 320 and can acquire vehicle information such as a vehicle speed, a yaw rate, a steering angle, or the like. Further, the imaging system 300 is connected to a control ECU 330, which is a control device that outputs a control signal for causing a vehicle to generate braking force based on a determination result by the collision determination unit 318. Further, the imaging system 300 is also connected to an alert device 340 that issues an alert to the driver based on a determination result by the collision determination unit 318. For example, when the collision probability is high as the determination result of the collision determination unit 318, the control ECU 330 performs vehicle control to avoid a collision or reduce damage by applying a brake, pushing back an accelerator, suppressing engine power, or the like. The alert device 340 alerts a user by sounding an alert such as a sound, displaying alert information on a display of a car navigation system or the like, providing vibration to a seat belt or a steering wheel, or the like.

In the present embodiment, an area around a vehicle, for example, a front area or a rear area is captured by using the imaging system 300. FIG. 12B illustrates the imaging system when a front area of a vehicle (a capturing area 350) is captured. The vehicle information acquisition device 320 transmits an instruction to the imaging system 300 or the imaging device 310. Such a configuration can further improve the ranging accuracy.

Although the example of control for avoiding a collision to another vehicle has been described above, the embodiment is applicable to automatic driving control for following another vehicle, automatic driving control for not going out of a traffic lane, or the like. Furthermore, the imaging system is not limited to a vehicle such as the subject vehicle and can be applied to a movable object (moving apparatus) such as a ship, an airplane, or an industrial robot, for example. In addition, the imaging system can be widely applied to a device which utilizes object recognition, such as an intelligent transportation system (ITS), without being limited to movable objects.

Modified Embodiments

The present invention is not limited to the embodiments described above, and various modifications are possible.

For example, an example in which a part of the configuration of any of the embodiments is added to another embodiment or an example in which a part of the configuration of any of the embodiments is replaced with a part of the configuration of another embodiment is also one of the embodiments of the present invention.

Further, the circuit configuration of the pixel 12 of the solid-state imaging device illustrated in the above embodiments is not limited to that illustrated in FIG. 2 and can be appropriately changed. For example, each of the pixels 12 may have a plurality of photoelectric converters PD or may further have a charge holding portion other than the floating diffusion FD.

Further, the above first to fifth embodiments have been described with a single solid-state imaging device having the pixel array unit 10, the signal processing circuit that processes the pixel signals output from the pixel array unit 10, and the pixel drive circuit that drives the pixel array unit 10. However, it is also possible to realize the device configuration illustrated in FIG. 1 by using two or more devices including a photoelectric conversion device including the pixel array unit 10 and a signal processing device including a signal processing circuit. The signal processing device in such a case may include the readout circuit unit 30 having an input unit to which a pixel signal output from the photoelectric conversion device is input.

Further, while a device intended for acquisition of an image, that is, a solid-state imaging device has been illustrated as an example in the above first to fifth embodiments, an application example of the present invention is not necessarily limited to the solid-state imaging device. For example, in a case of application to a device intended for ranging as described in the above seventh embodiment, it is not necessarily required to output an image. In such a case, it can be said that such a device is a photoelectric conversion device that converts optical information into a predetermined electric signal. The solid-state imaging device is one of the photoelectric conversion devices.

Further, the imaging system illustrated in the above sixth and seventh embodiments are examples of an imaging system to which the photoelectric conversion device of the present invention may be applied, and the imaging system to which the photoelectric conversion device of the present invention can be applied is not limited to the configurations illustrated in FIG. 11 and FIG. 12A.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-229127, filed Dec. 6, 2018 which is hereby incorporated by reference herein in its entirety.

What is claimed is:

1. A photoelectric conversion device comprising:
a plurality of pixels arranged to form a plurality of columns;
a plurality of analog-to-digital (AD) conversion units each provided to corresponding one of the plurality of columns; and
a readout circuit unit provided between the plurality of pixels and the plurality of AD conversion units,
wherein the readout circuit unit includes a first switch, a second switch and a signal holding unit for each of the plurality of columns,
wherein, on each of the columns, the first switch and the second switch are connected in series between a pixel of the plurality of pixels and an AD conversion unit of the plurality of AD conversion units,
wherein, on each of the columns, the signal holding units is connected to a first node between the second switch and the AD conversion unit,
wherein the first node is a node to which an analog signal to be input to the AD conversion unit is provided,
wherein the readout circuit unit further includes a plurality of third switches and a plurality of fourth switches each provided between neighboring columns,
wherein a third switch of the plurality of third switches is connected between second nodes, each of which connects the first switch and the second switch, on neighboring columns,
wherein a fourth switch of the plurality of fourth switches is connected between the first nodes on neighboring columns,
wherein the readout circuit unit further includes a plurality of column amplifiers each provided to a corresponding one of the plurality of columns, and on each of the columns, a column amplifier of the plurality of column amplifiers is provided between the first switch and the second switch, and
wherein the third switch is connected to an output node of the column amplifier, and the fourth switch is connected to the output node of the column amplifier.

2. The photoelectric conversion device according to claim 1, wherein the readout circuit unit further includes a plurality of fifth switches each provided between neighboring columns, and a fifth switch of the plurality of fifth switches is connected between third nodes, each of which connects the first switch and the column amplifier, on the neighboring columns.

3. The photoelectric conversion device according to claim 1, wherein the first switch, the second switch, and the third switch form a first switch circuit that operates so as to hold pixel signals output from the pixels in the plurality of signal holding units, respectively, in sampling periods that are different from each other.

4. The photoelectric conversion device according to claim 1, wherein the fourth switches form a second switch circuit that operates so as to average pixel signals held in the plurality of signal holding units and supply the average to the AD conversion units.

* * * * *